United States Patent
Saeki et al.

(10) Patent No.: US 6,804,970 B2
(45) Date of Patent: Oct. 19, 2004

(54) METHOD OF CONTROLLING REFRIGERATION CYCLE

(75) Inventors: Shinji Saeki, Tokyo (JP); Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 11 days.

(21) Appl. No.: 10/612,991

(22) Filed: Jul. 7, 2003

(65) Prior Publication Data

US 2004/0003603 A1 Jan. 8, 2004

(30) Foreign Application Priority Data

Jul. 8, 2002 (JP) .................................. 2002-198949

(51) Int. Cl.[7] .............................................. F25B 49/02
(52) U.S. Cl. ...................... 62/133; 62/228.3; 62/228.5
(58) Field of Search .......................... 62/133, 204, 208, 62/209, 210, 222, 223, 224, 225, 228.1, 228.3, 228.4, 228.5, 230

(56) References Cited

U.S. PATENT DOCUMENTS

| 4,653,288 | A | | 3/1987 | Sayo et al. ................... 62/210 |
| 5,893,272 | A | * | 4/1999 | Hanselmann et al. ......... 62/133 |
| 5,924,296 | A | * | 7/1999 | Takano et al. ................ 62/133 |
| 5,950,440 | A | * | 9/1999 | Niimi et al. .................. 62/133 |
| 6,615,595 | B2 | * | 9/2003 | Baruschke et al. ........... 62/133 |
| 2001/0010157 | A1 | | 8/2001 | Bascobert .................... 62/217 |
| 2002/0069656 | A1 | | 6/2002 | Niimi ....................... 62/228.1 |

FOREIGN PATENT DOCUMENTS

| EP | 1 111 238 | 6/2001 |
| JP | 3-27261 | 6/1991 |
| JP | WO 02/101237 | 6/2001 |
| JP | 2001-180261 | 7/2001 |
| JP | 2003-166664 | 6/2003 |
| JP | 2003-278650 | 10/2003 |
| JP | 2003-322274 | 11/2003 |

OTHER PUBLICATIONS

Patent Abstracts of Japan, Publication No. 09–264622, dated Oct. 7, 1997/Discussed in the specification.
Patent Abstracts of Japan; Publication No. 2001–180261, dated Jul. 3, 2001/Discussed in the specification.
Patent Abstracts of Japan, Publication No. 2002–364532, dated Dec. 18, 2002.

(List continued on next page.)

*Primary Examiner*—Harry B. Tanner
(74) *Attorney, Agent, or Firm*—Westerman, Hattori, Daniels & Adrian, LLP

(57) ABSTRACT

The object of the present invention is to provide a method of controlling a refrigeration cycle such that maximum refrigerating capacity can be educed when the refrigeration cycle is started, the driving torque of a variable displacement compressor can be reduced when an automotive vehicle performs standing start or acceleration, and the refrigeration cycle can be operated with the maximum efficiency in a steady operating condition. Electric signals for control of a capacity control valve 5 for controlling the capacity of a variable displacement compressor and an electronic expansion valve are directly measured, and the differential pressure between a high pressure-side refrigerant pressure and a low pressure-side refrigerant pressure in the refrigeration cycle and the flow rate of refrigerant flowing therethrough are estimated based on the electric signals, whereby the energy of the refrigeration cycle is estimated, and further by using an engine rotational speed, the driving torque of the variable displacement compressor is estimated. This makes it possible to carry out energy control for as maximum refrigerating capacity operation, maximum efficiency operation, required minimum refrigerating capacity operation, and so forth, whereby it is possible to carry out not only fuel consumption saving operation but also energy control for reducing burden on the engine e.g. during idling and acceleration of the engine.

14 Claims, 19 Drawing Sheets

OTHER PUBLICATIONS

Patent Abstracts of Japan, Publication No. 2001-153495, dated Jun. 8, 2001.
Patent Abstracts of Japan, Publication No. 2001-295759, dated Oct. 26, 2001.
Patent Abstracts of Japan, Publication No. 2001-012358, dated Jan. 16, 2001.
Patent Abstracts of Japan, Publication No. 09-310777, dated Dec. 2, 1997.

* cited by examiner

METHOD OF CONTROLLING REFRIGERATION CYCLE

CROSS-REFERENCES TO RELATED APPLICATIONS, IF ANY

This application claims priority of Japanese Application No. 2002-198949 filed on Jul. 8, 2002 and entitled "Method of Controlling Refrigeration Cycle".

BACKGROUND OF THE INVENTION (1) Field of the Invention

This invention relates to a method of controlling a refrigeration cycle, and more particularly to a method capable of controlling a refrigeration cycle for an automotive air conditioner in a manner minimizing burden on an engine for driving a variable displacement compressor and at the same time with high accuracy.

(2) Description of the Related Art

In an automotive air conditioner, since a compressor thereof is driven by an engine, operating conditions of the air conditioner are largely influenced by operating conditions of the engine. Inversely, the automotive air conditioner is a burden on the engine, which requires extra energy for driving the same. This burden on the engine can be reduced by controlling the automotive air conditioner such that performance coefficient of a refrigeration cycle is optimized.

For example, a refrigeration cycle described in Japanese Unexamined Patent Publication No. 9-264622 uses, as a compressor, an electric motor-driven type whose rotational speed can be controlled, and as an expansion device, a pressure control valve, thereby providing control such that coefficient of performance of the refrigeration cycle is optimized. More specifically, the pressure control valve allows refrigerant to be filled in a space closed by a diaphragm that actuates a valve element, at a density within a range between a saturated liquid density at a refrigerant temperature of 0° C. and a saturated liquid density at a critical point of the refrigerant, with respect to a space volume of the hermetically sealed space with its valve hole closed, and controls the pressure and temperature of the refrigerant on an outlet side of a gas cooler along the optimum control curve on which the coefficient of performance of the refrigeration cycle is optimum. Further, as an expansion device, an electric pressure control valve is employed which is driven by a stepping motor. The electric pressure control valve also has the pressure and temperature of refrigerant on an inlet side thereof controlled along the optimum control curve.

Further, when an automotive vehicle performs standing start or acceleration during operation of an automotive air conditioner, to ensure that necessary engine output torque is obtained for the standing start or acceleration without largely increasing fuel consumption, the refrigeration cycle is controlled such that the displacement of a compressor of the refrigeration cycle, that is, driving torque is instantaneously reduced and progressively restored thereafter.

Further, the power output of an engine is required to be controlled depending on operating conditions of the automotive air conditioner which is a burden on the engine. For instance, during operation of the automotive air conditioner, by taking the driving torque of the compressor into account, engine output torque is controlled such that extra driving torque is produced therefor. The driving torque of the compressor is preset to a fixed value, and when the automotive air conditioner is operated, the engine output torque is controlled such that extra driving torque corresponding to the preset fixed value is produced.

The preset driving torque is sometimes largely different from actual driving torque, resulting in control of the engine output torque in a manner deviated from required torque. To cope with this, in a technique described e.g. in Japanese Unexamined Patent Publication No. 2001-180261, the driving torque of a variable displacement compressor is estimated based on a compressor control signal used for external electrical control of the delivery capacity of the variable displacement compressor, and engine output torque is controlled to a value to which the estimated driving torque is added.

As described above, according to the conventional method of controlling the refrigeration cycle, by controlling the expansion device such that the relationship between the pressure and temperature of refrigerant is along the optimum control curve, the refrigeration cycle can be operated efficiently. In this efficient operating method, however, since control points are always on the optimum control curve, the refrigeration cycle is not always controlled to the highest cooling performance. Therefore, even during the start of the refrigeration cycle, the refrigeration cycle is controlled such that it operates with maximum efficiency, which takes time before the refrigeration cycle reaches a steady operating condition.

Further, when the automotive vehicle performs standing start or acceleration, the driving torque of the compressor is controlled, and in such a case, especially when the displacement of the compressor is being restored after reduction thereof, there is no means for accurate estimation of actual driving torque of the compressor. This makes it impossible to control the refrigeration cycle with high accuracy.

Further, as for the driving torque of a variable displacement compressor, which is required for control of engine output torque, due to the fact that the delivery capacity of the variable displacement compressor is reflected on a differential pressure between two pressure monitoring points set in a refrigerant circulation circuit, the delivery capacity of the variable displacement compressor, that is, the driving torque of the compressor is estimated from a compressor control signal used for setting the differential pressure between the two pressure monitoring points. Actually, it is difficult to accurately estimate the driving torque of the variable displacement compressor from the compressor control signal alone.

SUMMARY OF THE INVENTION

The present invention has been made in view of the above points, and an object thereof is to provide a method of controlling a refrigeration cycle such that maximum refrigerating capacity can be educed when the refrigeration cycle is started, the driving torque of a variable displacement compressor can be reduced when an automotive vehicle performs standing start or acceleration, and the refrigeration cycle can be operated with the maximum efficiency in a steady operating condition.

To solve the above problem, the present invention provides a method of controlling a refrigeration cycle of an automotive air conditioner, characterized by estimating a differential pressure between a high pressure-side refrigerant pressure and a low pressure-side refrigerant pressure in the refrigeration cycle and a flow rate of refrigerant flowing therethrough, based on a first external electric signal for controlling the differential pressure between the high pressure-side refrigerant pressure and the low pressure-side refrigerant pressure in the refrigeration cycle or the flow rate of refrigerant flowing therethrough and a second external electric signal for controlling a size of a refrigerant passage in the refrigeration cycle, and estimating a compressor variable displacement ratio and driving torque of a compressor based on the estimated differential pressure and flow rate of refrigerant and an engine rotational speed, and controlling the first external electric signal and the second external electric signal such that refrigerating capacity of the refrigeration cycle is maximized when the automotive air conditioner is started, efficiency of the refrigeration cycle is maximized when the vehicle is in a steady traveling condition, and driving torque of the compressor is reduced when the vehicle is in an accelerating condition.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
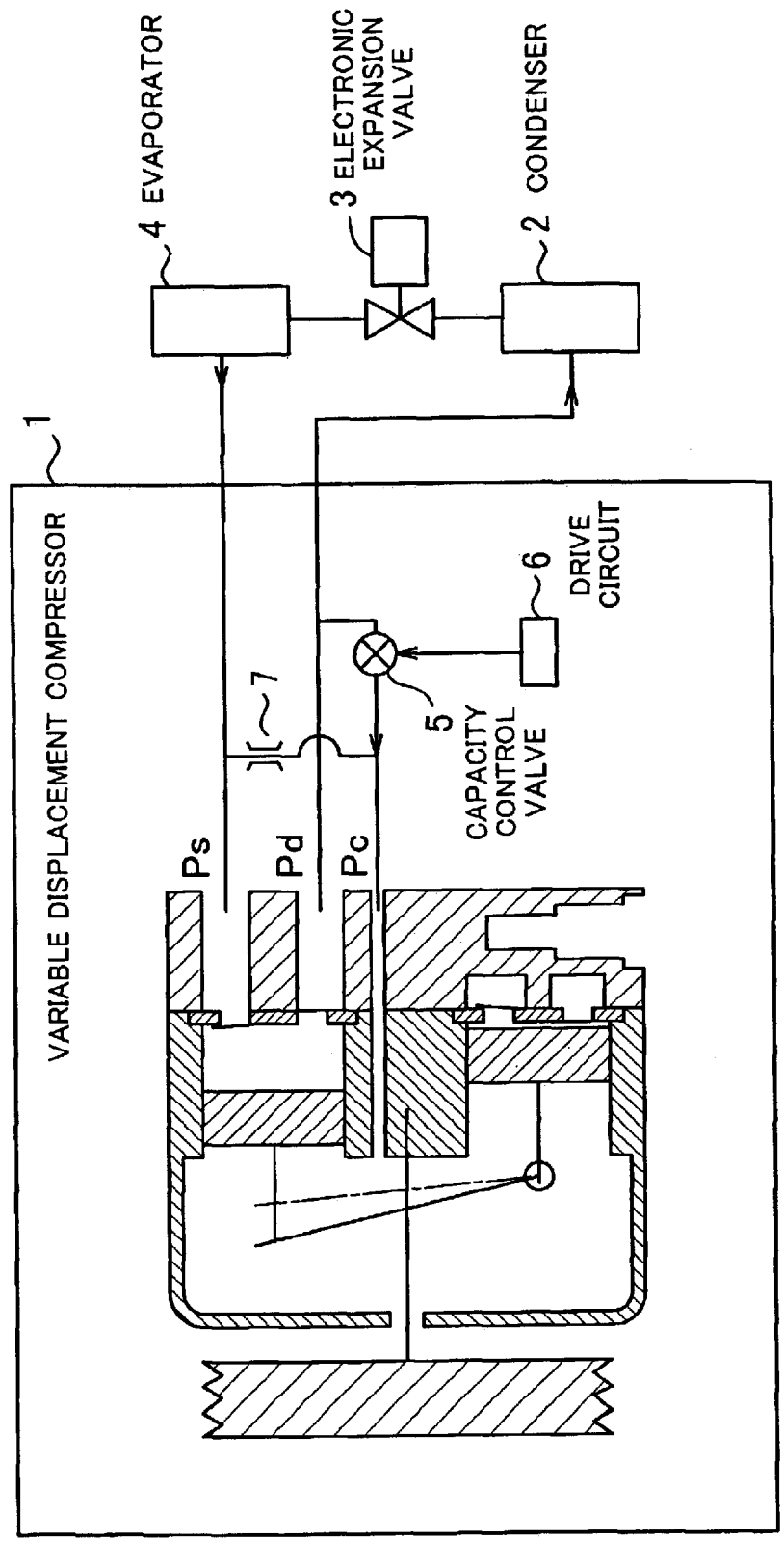
FIG. 1 is a diagram illustrating the basic construction of a first refrigeration system.

First of all, the principles of the present invention will be described.

The refrigerating capacity Q, that is, energy of a refrigeration cycle is proportional to the product of the differential pressure $\Delta P$ between a high pressure-side refrigerant pressure and a low pressure-side refrigerant pressure within the refrigeration cycle, and a flow rate Gf of refrigerant.

The refrigerating capacity Q can be represented by the following expression:

$$Q \infty Gf^* \Delta P \ldots \quad (1)$$

On the other hand, assuming that N represents an engine rotational speed, and T represents driving torque, the energy of an engine required for operating the refrigeration cycle can be represented by the following expression:

$$Q \infty N^* T \ldots \quad (2)$$

From the expressions (1), (2), it is possible to obtain the following expression:

$$Q \infty N^* T \infty Gf^* \Delta P \ldots \quad (3)$$

From this expression, it follows that if the differential pressure $\Delta P$ between the high pressure-side refrigerant pressure and the low pressure-side refrigerant pressure in the refrigeration cycle, the flow rate Gf of the refrigerant, and the engine rotational speed N are known, it is possible to know the driving torque of a variable displacement compressor. Now, the differential pressure $\Delta P$ is the difference between a discharge pressure Pd and a suction pressure Ps of the variable displacement compressor, or the difference between a pressure at an inlet and a pressure at an outlet of an expansion device. The differential pressure $\Delta P$ is a function of a first external electric signal for a control valve that controls the differential pressure across the variable displacement compressor or the expansion device to a constant value. On the other hand, the flow rate Gf of the refrigerant is a flow rate of refrigerant delivered from the variable displacement compressor or the expansion device, and is a function of a second external electric signal for a control valve that controls the refrigerant delivered from the variable displacement compressor or the expansion device to a constant flow rate. That is, the differential pressure $\Delta P$ and the flow rate Gf of the refrigerant are determined by electric currents i supplied to coils of the control valves by the first external electric signal and the second external electric signal, and therefore, by directly detecting the values of the electric currents i, the energy of the refrigeration cycle can be accurately determined.

Further, since the engine rotational speed N is known, it is possible to know the driving torque T from the expression (3) for calculating the energy of the engine required for operating the refrigeration cycle. Moreover, since parameters for determining the energy of the refrigeration cycle can be accurately detected, it is possible to calculate the driving torque T more accurately.

From the above, by controlling the differential pressure ΔP and the flow rate Gf of the refrigerant using the first external electric signal and the second external electric signal, it becomes possible not only to freely control the energy of the refrigeration cycle but also to freely control the driving torque T.

Hereinafter, embodiments of the present invention will be described in detail with reference to the drawings.

FIG. 1 is a diagram illustrating the basic construction of a first refrigeration system.

The first refrigeration system comprises a variable displacement compressor 1 for compressing refrigerant, a condenser 2 for condensing the compressed refrigerant, an electronic expansion valve 3 for adiabatically expanding the condensed refrigerant, and an evaporator 4 for evaporating the expanded refrigerant.

The variable displacement compressor 1 is of a flow rate control type that delivers refrigerant at a constant flow rate, while for the electronic expansion valve 3, there is used a differential pressure control type that controls the differential pressure between a pressure at a refrigerant inlet and a pressure at a refrigerant outlet of the variable displacement compressor 1, to a constant value, or a proportional control type. Alternatively, the variable displacement compressor 1 is of the differential pressure control type, and the electronic expansion valve 3 is of the flow rate control type or the proportional control type.

The variable displacement compressor 1 is configured b such that refrigerant discharged from a discharge chamber thereof and having the discharge pressure Pd is directly supplied to the condenser 2, and at the same time, part of the refrigerant is supplied to a crank chamber while changing the pressure thereof to a pressure Pc by a capacity control valve 5. The capacity control valve 5 is connected to a drive circuit 6. The variable displacement compressor 1 is also configured such that refrigerant returned from the evaporator 4 and having the suction pressure Ps is supplied to a suction chamber, and further, an orifice 7 is provided between the suction chamber and the discharge chamber.

The capacity control valve 5 controls refrigerant discharged from the variable displacement compressor 1 such that the refrigerant is discharged at a constant flow rate or with a constant differential pressure determined by the first external electric signal supplied by the drive circuit 6. Further, the electronic expansion valve 3 controls the size of a flow passage of the refrigerant in response to the second external electric signal supplied by a drive circuit, not shown, thereby providing control such that the differential pressure between a pressure at a refrigerant inlet and a pressure at a refrigerant outlet is constant.

Next, a description will be given of a case where the variable displacement compressor 1 of the flow rate control type and the electronic expansion valve 3 of the differential pressure control type or the proportional control type are combined, and a case where the variable displacement compressor 1 of the differential pressure control type and the electronic expansion valve 3 of the flow rate control type or the proportional control type are combined.

Figure 2:
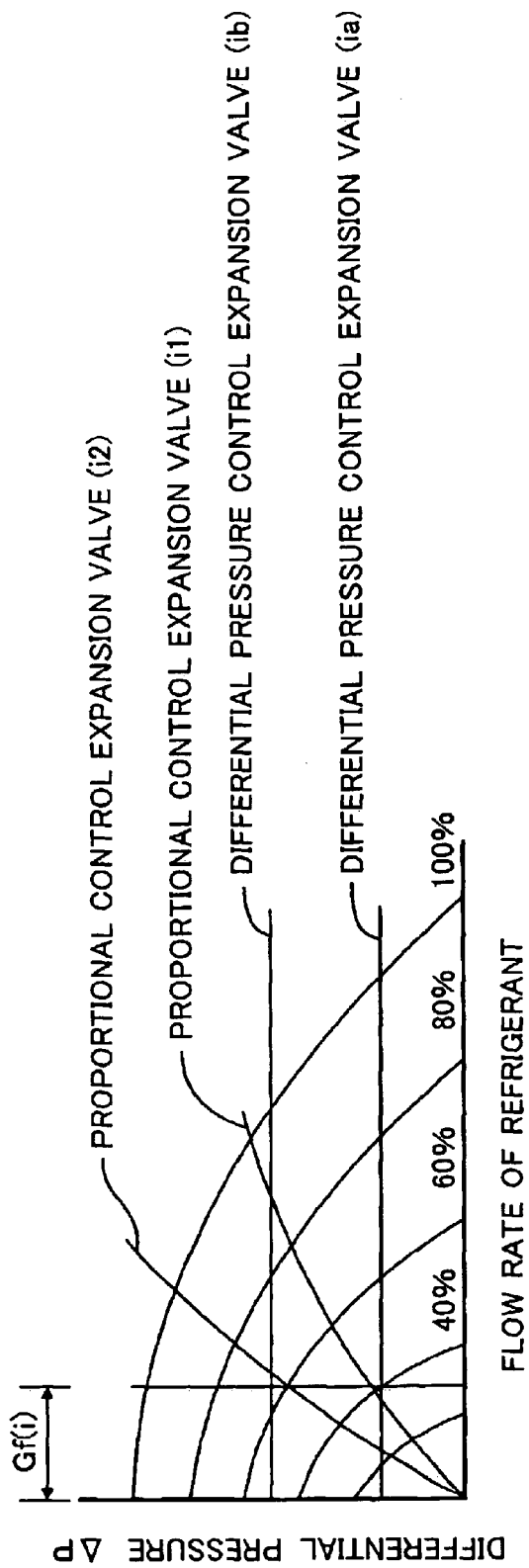
FIG. 2 is a diagram showing differential pressure-flow rate characteristics of the first refrigeration system incorporating a flow rate control-type variable displacement compressor.

FIG. 2 is a diagram showing differential pressure-flow rate characteristics of the first refrigeration system incorporating the flow rate control-type variable displacement compressor.

In the illustrated characteristics, the ordinate represents the differential pressure between the discharge pressure Pd and the suction pressure Ps of the variable displacement compressor 1, and the abscissa represents the flow rate of refrigerant flowing through the refrigeration cycle. Here, curves indicate compressor variable displacement ratios assumed when the variable displacement compressor 1 is operating at certain rotational speeds, and a curve furthest from the origin indicates a compressor variable displacement ratio of 100%, i.e. maximum operation of the variable displacement compressor 1.

Since the variable displacement compressor 1 is of the flow rate control type, the flow rate Gf(i) of refrigerant delivered therefrom is determined by the current value i of the first external electric signal supplied by the drive circuit 6. Further, as to the differential pressure ΔP across the electronic expansion valve 3, when the electronic expansion valve 3 is a differential pressure control expansion valve, the differential pressure ΔP is determined by the current value ia, ib of the second external electric signal supplied to the differential pressure control expansion valve, whereas when the electronic expansion valve 3 is a proportional control expansion valve, the inclination is determined by the current value i1, i2 of the second external electric signal supplied to the proportional control expansion valve. Accordingly, in the refrigeration system, since the flow rate Gf(i) of refrigerant in the variable displacement compressor 1 and the differential pressure ΔP are known, it is possible to know a variable displacement ratio at the time.

The variable displacement ratio indicates an operating condition of the variable displacement compressor 1, and hence when an automotive vehicle is traveling at an approximately constant speed, the flow rate Gf(i) of the variable displacement compressor 1 and the differential pressure ΔP across the electronic expansion valve 3 can be controlled such that the differential pressure is minimized for the same amount of energy, thereby making it possible to maximize the efficiency of the refrigeration system. Further, when an automotive air conditioner is started, especially when it is started in a very high outdoor temperature condition, a maximum refrigerating capacity is required. For the maximum refrigerating capacity, inversely to the case of the maximum efficiency operation, the flow rate Gf(i) of refrigerant from the variable displacement compressor 1 and the differential pressure ΔP across the electronic expansion valve 3 are controlled such that the differential pressure is maximized. Further, when the automotive vehicle performs standing start or acceleration, the engine requires an extra output torque. The driving torque of the variable displacement compressor 1 at this time can be known from the energy of the refrigeration cycle as the refrigerating capacity thereof and the engine rotational speed, and therefore, it is possible to control the flow rate Gf(i) of refrigerant from the variable displacement compressor 1 and the differential pressure ΔP across the electronic expansion valve 3 such that the energy of the refrigeration cycle is reduced by the amount of the extra output torque required by the engine. It should be noted that since driving torque corresponding to the engine rotational speed can be known from the energy of the refrigeration cycle in operation, it is possible to utilize the driving torque for control of engine output torque e.g. during idling of the automotive vehicle. More specifically, by using the value of the driving torque, the engine output torque can be controlled to a value to which the driving torque is added, whereby it is possible to prevent inconveniences, such as an unstable operation of the engine, and further a stoppage thereof.

Next, a description will be given of examples of the variable displacement compressor 1 and the electronic expansion valve 3, which constitute the first refrigeration system.

Figure 3:
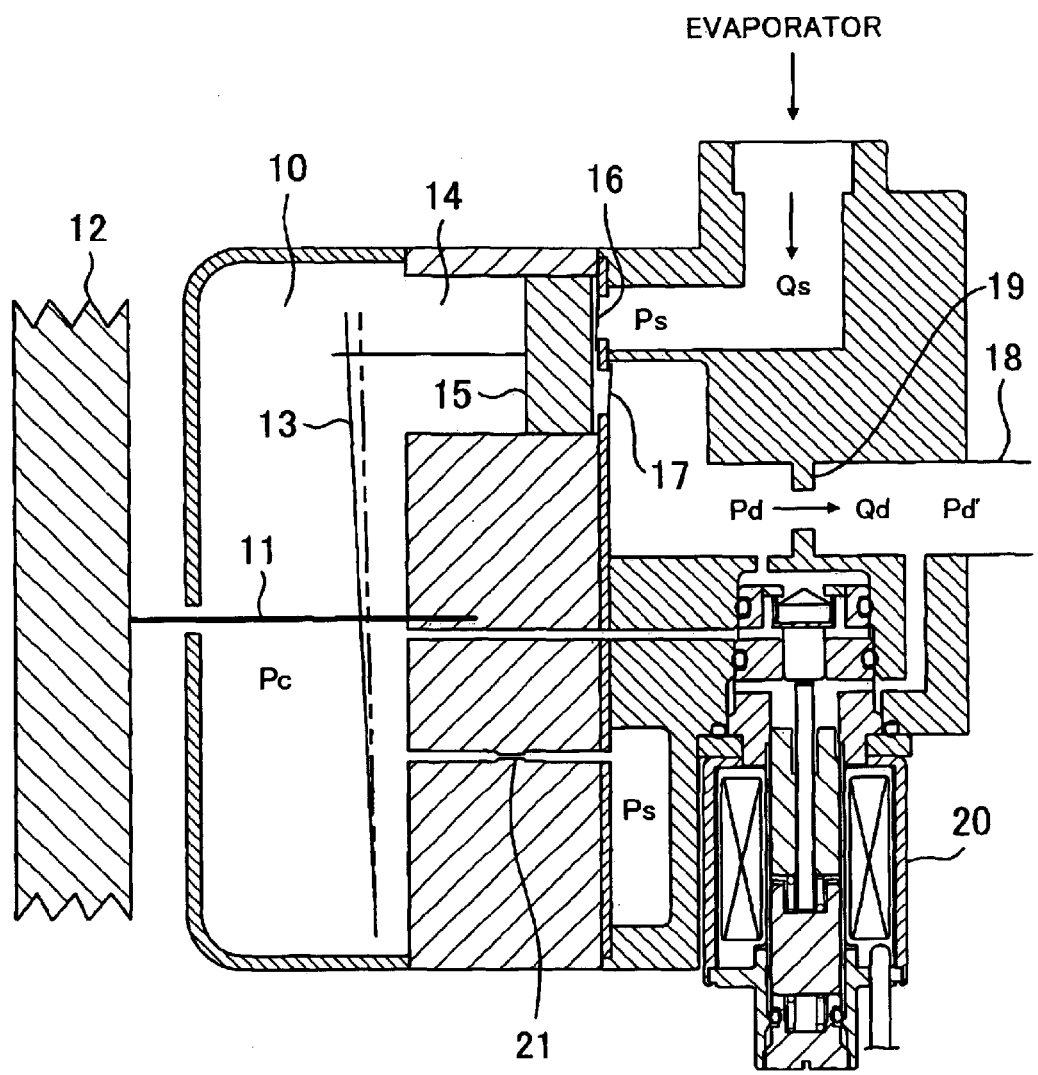
FIG. 3 is a cross-sectional view showing an example of the construction of the flow rate control-type variable displacement compressor.
Figure 4:
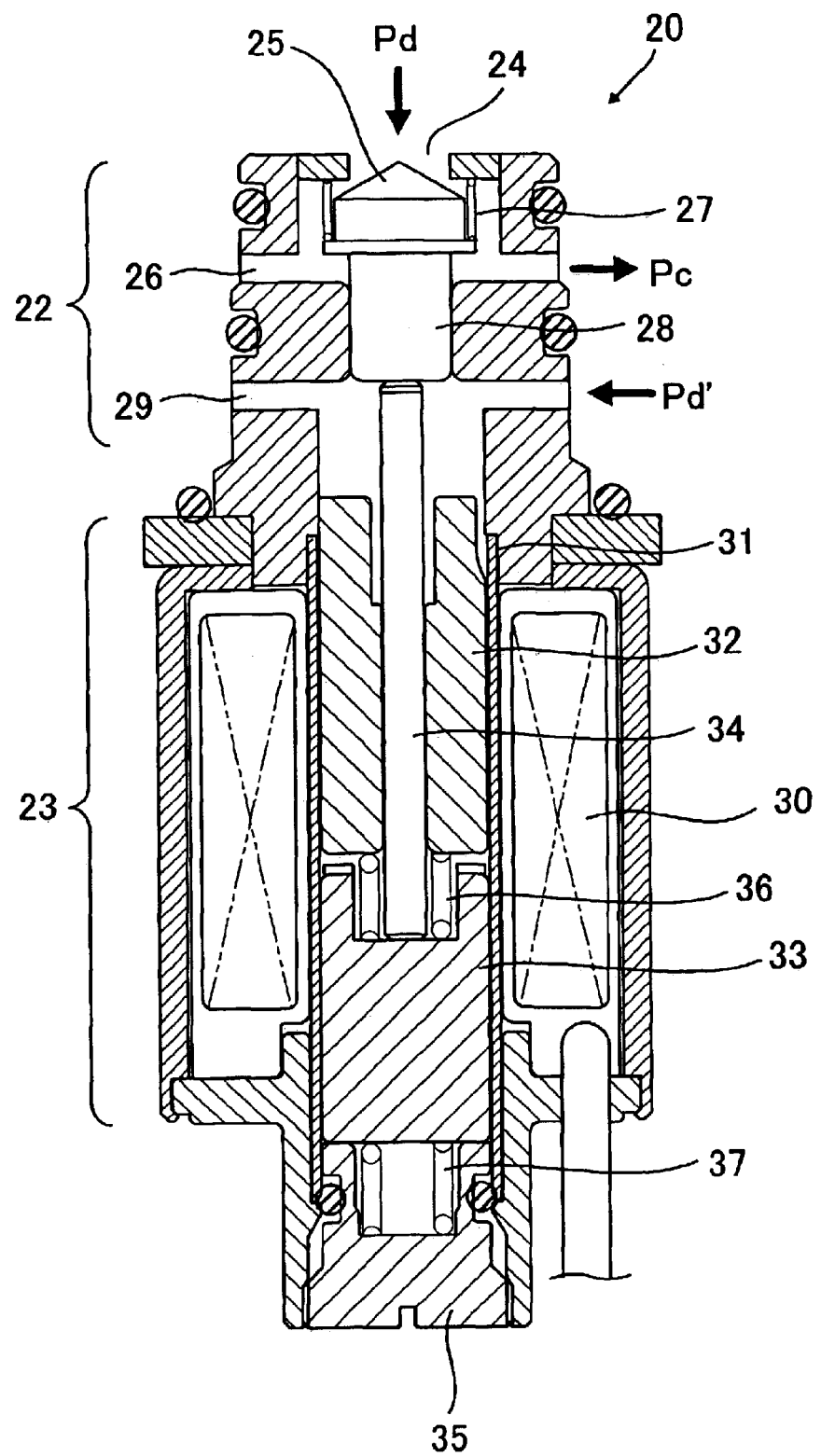
FIG. 4 is a cross-sectional view showing in detail the construction of a differential pressure solenoid valve employed in the FIG. 3 variable displacement compressor.

FIG. 3 is a cross-sectional view showing an example of the construction of the flow rate control-type variable displacement compressor. FIG. 4 is a cross-sectional view showing in detail the construction of a differential pressure solenoid valve employed in the FIG. 3 variable displacement compressor.

The variable displacement compressor includes a crank chamber 10 formed gastight and a rotating shaft 11 rotatably supported in the crank chamber 10. The rotating shaft 11 has one end extending outward from the crank chamber 10 via a shaft sealing device, not shown, and having a pulley 12 fixed thereto which receives a driving force transmitted from an output shaft of the engine. A wobble plate 13 is fitted on the rotating shaft 11 such that the inclination angle of the wobble plate 13 can be changed. A plurality of cylinders 14 (only one of which is shown in the figure) are arranged around the axis of the rotating shaft 11. In each cylinder 14, there is arranged a piston 15 for converting rotating motion of the wobble plate 13 to reciprocating motion. Each of the cylinders 14 is connected to the suction chamber and the discharge chamber via a suction relief valve 16 and a discharge relief valve 17, respectively. The respective suction chambers associated with the cylinders 14 communicate with each other to form one chamber which is connected to the evaporator. Similarly, the respective discharge chambers associated with the cylinders 14 communicate with each other to form one chamber which is connected to the condenser via a discharge-side refrigerant flow path 18.

In the discharge-side refrigerant flow path 18 of the discharge chamber, there is provided an orifice 19 with a fixed passage area. In a refrigerant passage communicating between the discharge chamber and the crank chamber 10, there is disposed a differential pressure solenoid valve 20 used for capacity control, and in a refrigerant passage communicating between the crank chamber 10 and the suction chamber is provided an orifice 21. The differential pressure solenoid valve 20 is configured to receive the differential pressure (Pd−Pd') generated between the upstream side and the downstream side of the orifice 19.

The differential pressure solenoid valve 20 has been proposed by the present applicant in the specification of Japanese Patent Application No. 2001-170434. As shown in FIG. 4, this valve 20 comprises a valve section 22 also playing the role of a pressure-sensing section, and a solenoid section 23.

The valve section 22 includes a port 24 for introducing a discharge pressure Pd, a valve element 25 for delivering the introduced discharge pressure Pd such that it is controlled to a crank chamber pressure Pc, a port 26 for delivering the crank chamber pressure Pc, a spring 27 for urging the valve element 25 in the valve-opening direction, a pressure-sensing piston 28 integrally formed with the valve element 25 in an axially movable manner along a central axis of the differential pressure solenoid valve 20, and having substantially the same diameter as that of the port 24, and a port 29 for introducing the pressure Pd' on the downstream side of the orifice 19 to an opposite side of the pressure-sensing piston 28 to the valve element 25.

The solenoid section 23 has a coil 30 having a hollow cylindrical void portion in which is disposed a sleeve 31.

The sleeve 31 has a core 32 forming a fixed core, rigidly fixed to one end thereof, and a plunger 33 forming a movable core, loosely inserted therein in an axially movable manner. A shaft 34 is axially arranged through the core 32, and has one end thereof brought into abutment with the pressure-sensing piston 28, and the other end thereof brought into abutment with the plunger 33. The sleeve 31 has an adjusting screw 35 screwed into the other end thereof. Further, a spring 36 is arranged between the core 32 and the plunger 33, and a spring 37 is arranged between the plunger 33 and the adjusting screw 35.

In the variable displacement compressor constructed as above, while the engine is operated at a constant rotational speed, refrigerant from the evaporator is drawn into the suction chamber at a flow rate Qs, and discharged from the discharge chamber at a flow rate Qd. At this time, the differential pressure solenoid valve 20 introduces the discharge pressure Pd of the refrigerant from the discharge chamber into the crank chamber 10 via the valve section 22. This causes the delivery capacity of the variable displacement compressor to be controlled to a value corresponding to the pressure Pc within the crank chamber 10. The pressure Pc in the crank chamber 10 is returned to the suction chamber via the orifice 21.

At this time, a current signal corresponding to the differential pressure across the differential pressure solenoid valve 20, dependent on external conditions, is supplied to the coil 30 of the solenoid section 23.

Therefore, the differential pressure solenoid valve 20 senses the differential pressure developed across the orifice 19 by the valve element 25 of the valve section 22 and the pressure-sensing piston 28, and controls the valve element 25 of the valve section 22 such that the differential pressure becomes equal to a predetermined set value, thereby providing control such that the flow rate of refrigerant flowing through the discharge-side refrigerant flow path 18 is held at the constant flow rate Qd.

More specifically, when the engine rotational speed is increased, the discharge pressure Pd is increased, whereby the flow rate Qd of refrigerant discharged from the discharge chamber tends to increase. Then, since the discharge pressure Pd is increased, the valve element 25 of the valve section 22 and the pressure-sensing piston 28 are moved toward the solenoid section 23. The valve element 25 is moved in the direction of opening of the valve section 22 by the urging force of the spring 27, thereby increasing the flow rate of refrigerant introduced into the crank chamber 10. This increases the pressure Pc in the crank chamber 10, whereby the variable displacement compressor is controlled toward a minimum operation side to reduce the flow rate of refrigerant discharged from the discharge chamber.

Inversely, when the engine rotational speed is reduced, the flow rate Qd of refrigerant discharged from the discharge chamber tends to decrease to decrease the discharge pressure Pd, which causes the valve element 25 of the valve section 22 and the pressure-sensing piston 28 to be moved upward, as viewed in the figure. The valve element 25 is moved in the valve-closing direction to reduce the flow rate of refrigerant introduced into the crank chamber 10. This decreases the pressure Pc in the crank chamber 10, whereby the variable displacement compressor is controlled toward a maximum operation side to increase the flow rate of refrigerant discharged from the discharge chamber.

As a result, even if the engine rotational speed is changed, the differential pressure solenoid valve 20 controls the flow rate of refrigerant introduced into the crank chamber 10 such that the differential pressure across the orifice 19 is held constant. Therefore, since the orifice 19 is fixed and the differential pressure thereacross is controlled to be constant, the flow rate Qd of refrigerant discharged from the variable displacement compressor is controlled to a constant flow rate.

Figure 5:
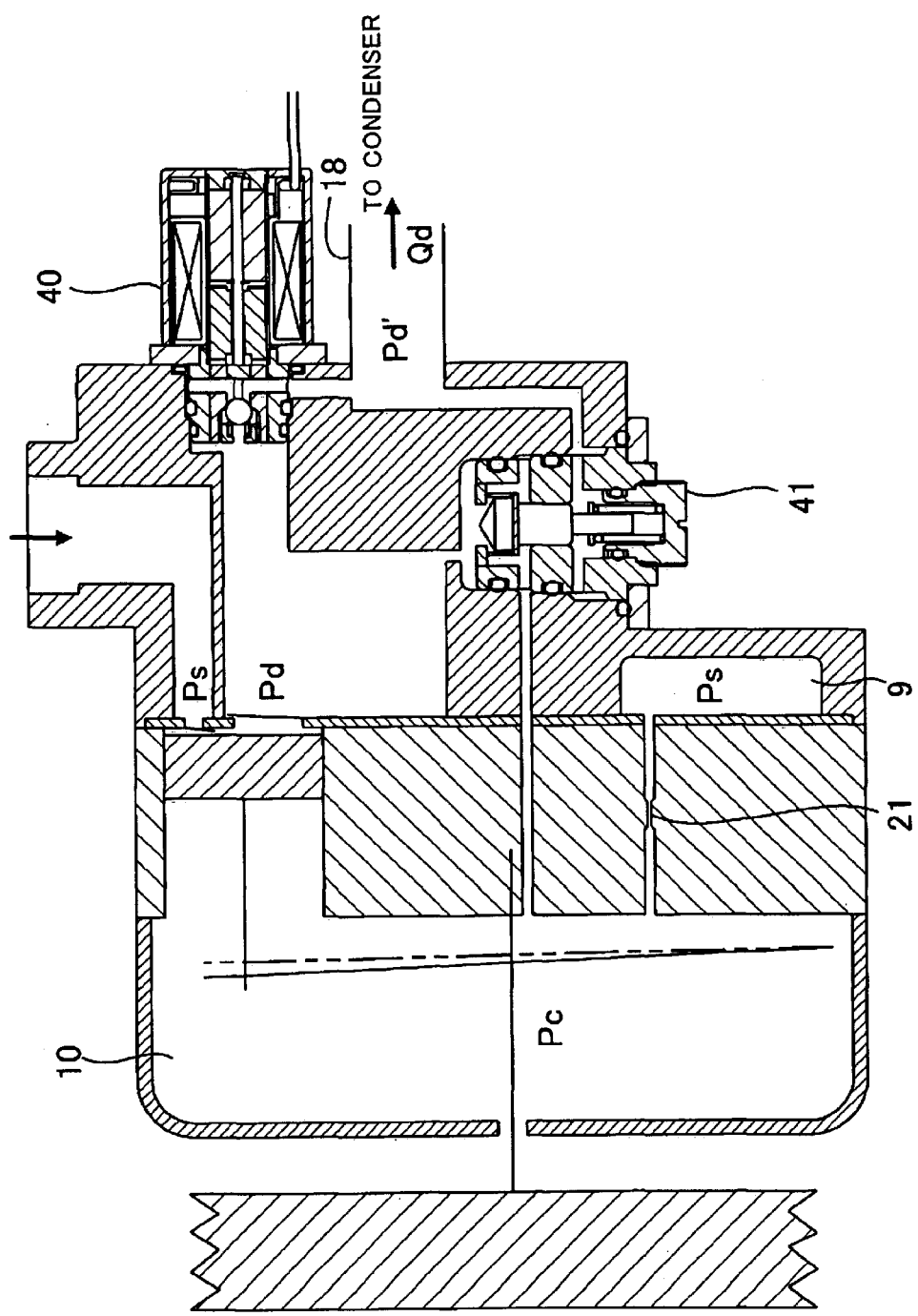
FIG. 5 is a cross-sectional view showing another example of the construction of the flow rate control-type variable displacement compressor.
Figure 6:
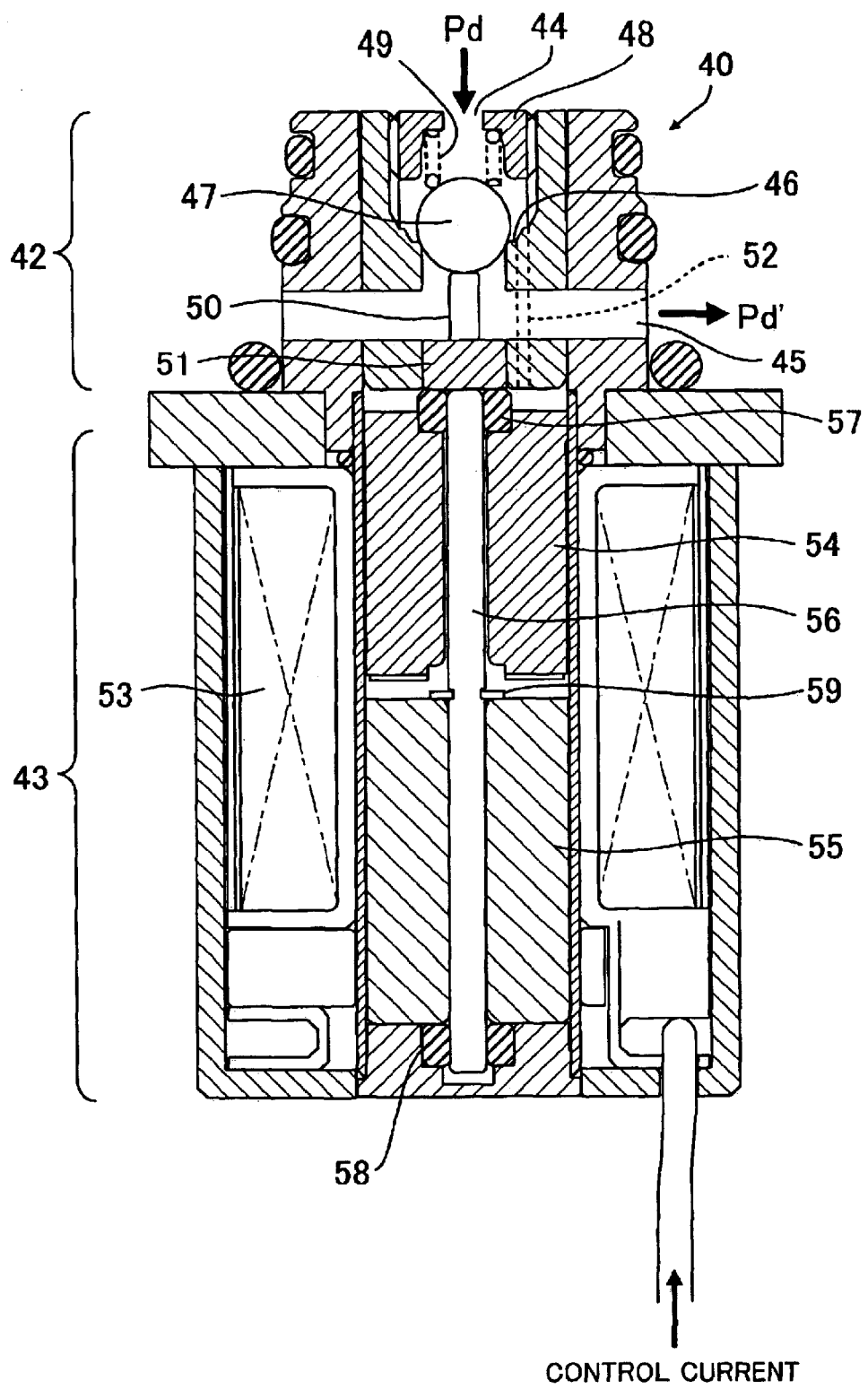
FIG. 6 is a cross-sectional view showing in detail the construction of a proportional flow rate control solenoid valve employed in the FIG. 5 variable displacement compressor.
Figure 7:
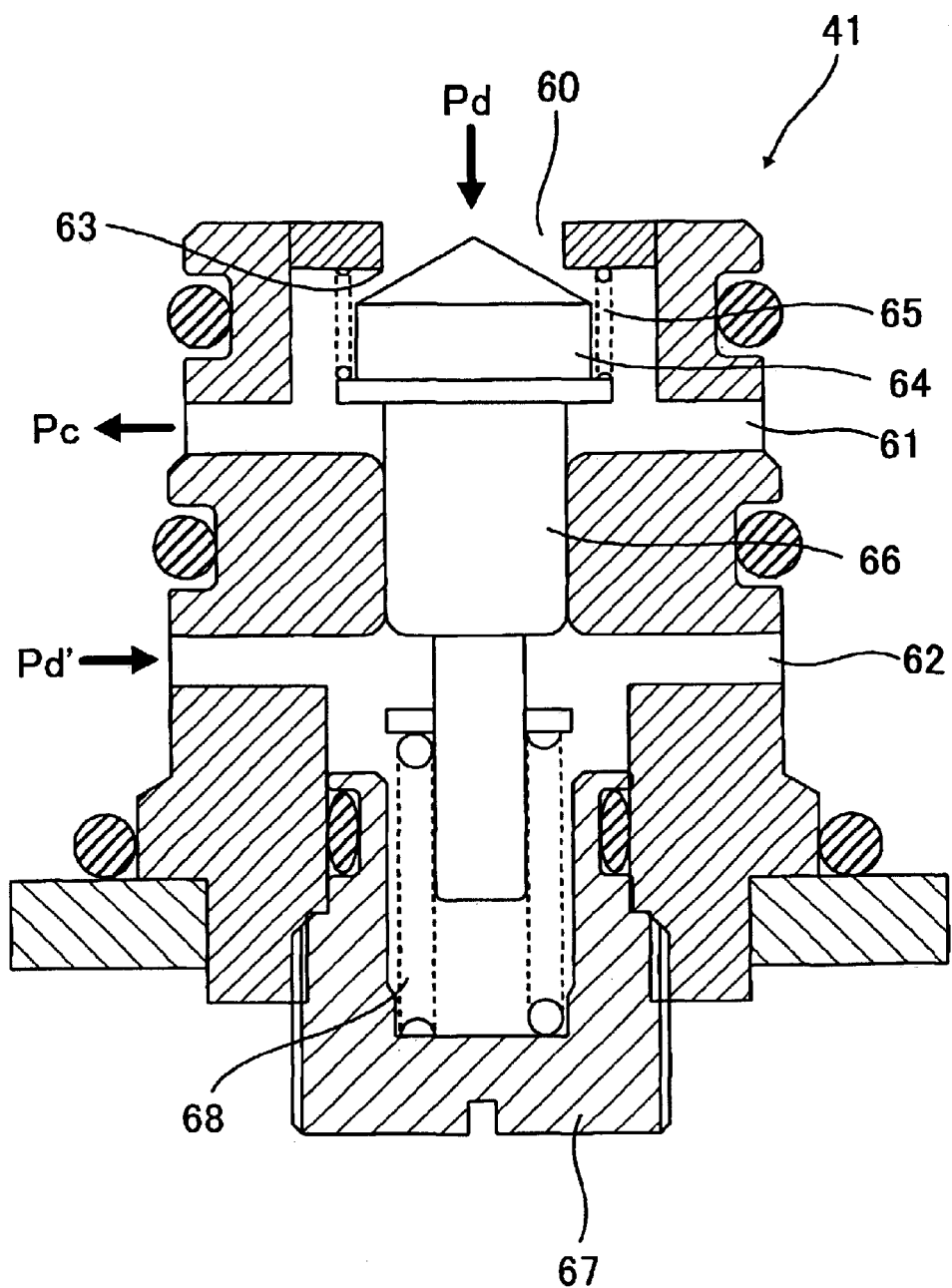
FIG. 7 is a cross-sectional view showing in detail the construction of a constant differential pressure valve employed in the FIG. 5 variable displacement compressor.

FIG. 5 is a cross-sectional view showing another example of the construction of the flow rate control-type variable displacement compressor. FIG. 6 is a cross-sectional view showing in detail the construction of a proportional flow rate control solenoid valve employed in the FIG. 5 variable displacement compressor. FIG. 7 is a cross-sectional view showing in detail the construction of a constant differential pressure valve employed in the FIG. 5 variable displacement compressor. It should be noted that in FIGS. 5 to 7, component elements identical to or equivalent to those shown in FIG. 3 and FIG. 4 are designated by the same reference numerals, and detailed description thereof is omitted.

This flow rate control-type variable displacement compressor has been proposed by the present applicant in the specification of Japanese Patent Application No. 2001-170435, in which a proportional flow rate control solenoid valve 40 is provided in a discharge-side refrigerant flow path 18 leading from a discharge chamber to the condenser, such that the proportional flow rate control solenoid valve 40 forms a variable orifice which is capable of proportionally changing the area of the refrigerant flow path 18 using an external signal. Further, the discharge chamber is connected to a crank chamber 10 via a constant differential pressure valve 41, and the crank chamber 10 is connected to a suction chamber via a fixed orifice 21. The constant differential pressure valve 41 introduces therein a discharge pressure Pd from the discharge chamber and a pressure Pd' having passed through the proportional flow rate control solenoid valve 40 from the discharge-side refrigerant flow path 18, and controls refrigerant flowing from the discharge chamber to the crank chamber 10, and further from the crank chamber 10 to the suction chamber via the fixed orifice 21, such that the differential pressure developed across the proportional flow rate control solenoid valve 40 is constant.

Referring to FIG. 6, the proportional flow rate control solenoid valve 40 comprises a valve section 42 and a solenoid section 43. The valve section 42 includes a port 44 for introducing the discharge pressure Pd from the discharge chamber, and a port 45 for guiding out the discharge Pd' reduced by the valve section 42 into the discharge-side refrigerant flow path 18. A passage communicating between these ports is formed with a valve seat 46, and on the upstream side of the valve seat 46 is disposed a ball valve element 47 in a manner opposed to the valve seat 46. An adjusting screw 48 is screwed into an open end of the port 44, and a spring 49 is arranged between the valve element 47 and the adjusting screw 48, for urging the valve element 47 in the valve-closing direction. Further, the valve element 47 is in abutment with one end of a shaft 50 axially extending through a valve hole. The other end of the shaft 50 is rigidly fixed to a piston 51 arranged in an axially movable manner. The piston 51 has substantially the same diameter as that of the valve hole such that the pressure Pd' on the downstream side of the valve element 47 is equally applied in respective axial both directions to prevent the pressure Pd' from adversely affecting the control of the valve element 47. Further, a communication passage 52 is formed between a space on the upstream side of the valve element 47 and a space on a solenoid section side of the piston 51 such that the discharge pressure Pd is introduced on a back pressure side of the piston 51 to thereby cancel out the discharge pressure Pd applied to the valve element 47.

The solenoid section 43 includes a coil 53, a core 54, a plunger 55, and a shaft 56. The shaft 56 has both ends supported by guides 57, 58, respectively. The shaft 56 has an E ring 59 fitted on an approximately central portion thereof such that the shaft 56 is moved together with the plunger 55 when the plunger 55 is attracted by the core 54. Due to this configuration, when the plunger 55 is moved upward, as viewed in the figure, the shaft 56 pushes the piston 51 abutting an upper end thereof, as viewed in the figure, which acts on the valve element 47 in the valve-opening direction. The amount of movement of the shaft 56 is proportional to the value of an electric current supplied to the coil 53. Therefore, the area of a flow passage of refrigerant passing through the proportional flow rate control solenoid valve 40 can be determined depending on the value of a control current supplied to the coil 53.

As shown in FIG. 7, the constant differential pressure valve 41 includes a port 60 for introducing therein the discharge pressure Pd from the discharge chamber, a port 61 for introducing the pressure Pc controlled by the constant differential pressure valve 41 into the crank chamber 10, and a port 62 for introducing therein the pressure Pd' reduced by the proportional flow rate control solenoid valve 40.

A passage communicating between the port 60 and the port 61 is formed with a valve seat 63, and on the downstream side of the valve seat 63 is arranged a valve element 64 in a manner opposed to the valve seat 63. The valve element 64 is formed with a flange, and a spring 65 is arranged between the valve seat 63 and the flange, for urging the valve element 64 in the valve-opening direction.

On the same axis as that of the valve element 64, there is provided a pressure-sensing piston 66 which is axially movably arranged for receiving the discharge pressure Pd from the port 61 and the pressure Pd' from the port 62 at respective both end surfaces thereof. The pressure-sensing piston 66 is rigidly fixed to the valve element 64 for motion in unison therewith.

On a lower side of the pressure-sensing piston 66, as viewed in the figure, a spring load-adjusting screw 67 is provided. Arranged between the pressure-sensing piston 66 and the load-adjusting screw 67 is a spring 68 for urging the pressure-sensing piston 66 in the direction of closing of the valve element 64.

In the variable displacement compressor constructed as above, the proportional flow rate control solenoid valve 40 supplied with a predetermined control current narrows the discharge-side refrigerant flow path 18 communicating with the condenser to thereby form an orifice of a predetermined size such that a predetermined differential pressure (Pd−Pd') is developed by the flow rate Qd of refrigerant. Further, in the constant differential pressure valve 41, the pressure-sensing piston 66 receives the predetermined differential pressure (Pd>Pd'), and the valve element 64 is made stationary in a position where a force directed downward, as viewed in the figure, caused by the predetermined differential pressure, and the loads of the springs 65, 68 are balanced, to thereby control the valve lift of the constant differential pressure valve 41. Therefore, the constant differential pressure valve 41 senses the differential pressure across the proportional flow rate control solenoid valve 40, determined by the control current, and adjusts the valve lift thereof such that the differential pressure becomes equal to a predetermined value (i.e. the fixed flow rate Qd) set in advance, thereby controlling the flow rate of refrigerant introduced into the crank chamber 10. Thus, a constant flow rate-type variable displacement compressor is constructed.

Next, a description will be given of examples of the electronic expansion valve 3 combined with the constant flow rate-type variable displacement compressor. The examples of the electronic expansion valve 3 include a differential pressure control expansion valve and a proportional control expansion valve.

Figure 8:
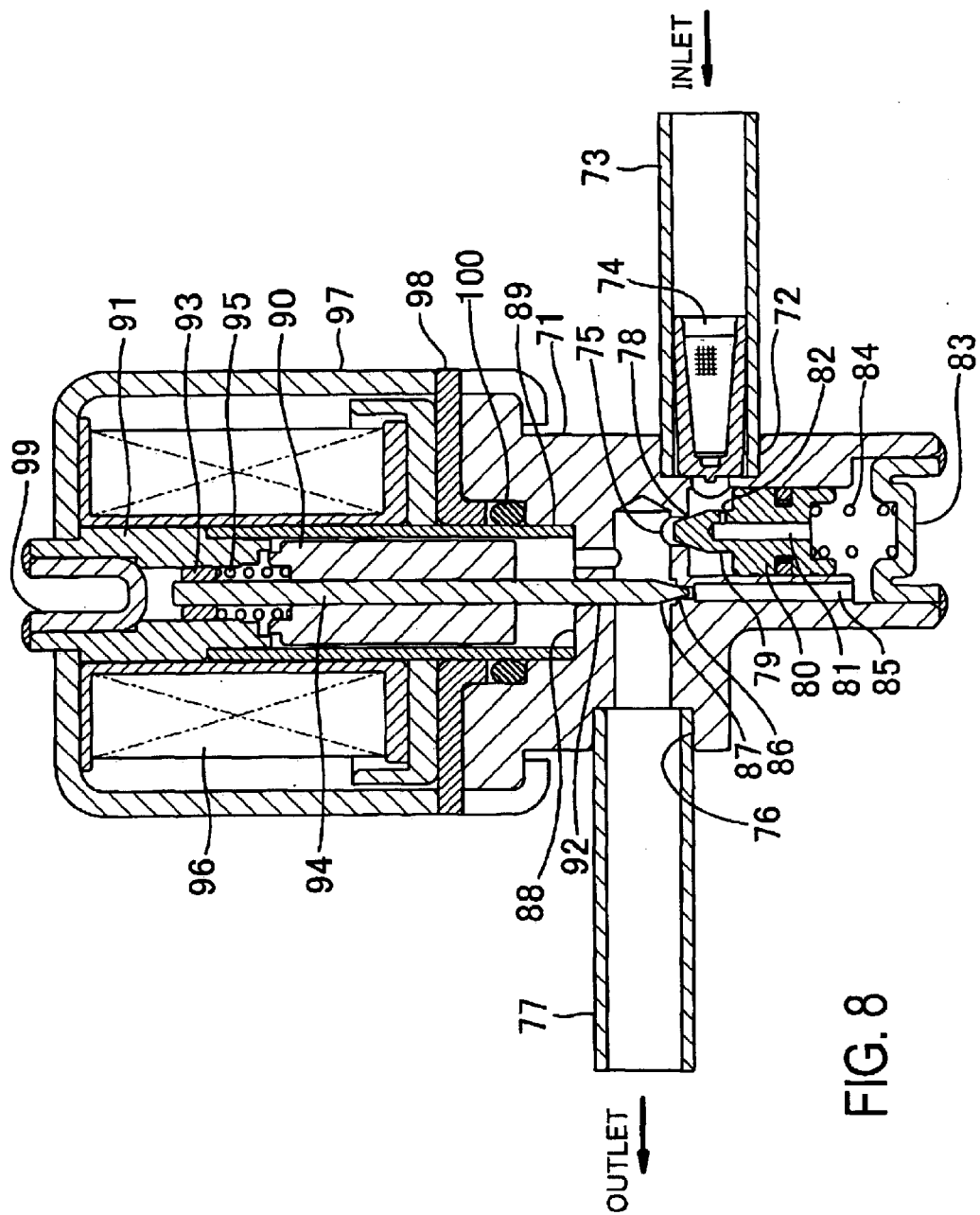
FIG. 8 is a cross-sectional view showing in detail the construction of a differential pressure control expansion valve employed in the FIG. 5 variable displacement compressor.

FIG. 8 is a cross-sectional view showing in detail the construction of a differential pressure control expansion valve employed in the FIG. 5 variable displacement compressor.

The differential pressure control expansion valve has been proposed by the present applicant in the specification of Japanese Patent Application No. 2002-125365. The differential pressure control expansion valve has an inlet port 72 opening in a side surface of a body 71 thereof, for receiving high-pressure refrigerant. To the inlet port 72 is welded a refrigerant piping 73 which has a strainer 74 arranged therein in a manner blocking a passage of the piping 73. The inlet port 72 is communicated with an outlet port 76 via a refrigerant flow path 75. The outlet port 76 has a refrigerant piping 77 welded thereto. In an intermediate portion of the refrigerant flow path 75, a main valve seat 78 is integrally formed with the body 71. A main valve element 79 is arranged in a manner opposed to the main valve seat 78 from the upstream side of a main valve, for forming the main valve together with the main valve seat 78. The main valve element 79 is integrally formed with a piston 80 which defines a chamber for introducing refrigerant together with the main valve seat 78. The piston 80 is disposed in a manner movable forward and backward such that the main valve element 79 can move toward and away from the main valve seat 78, and has a refrigerant passage 81 formed along a central axis thereof. The refrigerant passage 81 is communicated with an orifice 82 which laterally extends through the main valve element 79 to the refrigerant passage 81. The refrigerant passage 81 and the orifice 82 form a restricted passage which allows high-pressure refrigerant introduced into the chamber formed above the piston 80, as viewed in the figure, to flow into a space formed below the piston 80, as viewed in the figure. The space formed below the piston 80, as viewed in the figure, is closed by a press-fit member 83, and between the piston 80 and the press-fit member 83, there is arranged a spring 84 for urging the piston 80 in a main valve-closing direction. The press-fit member 83 has a lower end portion thereof, as viewed in the figure, welded to the body 71 after adjusting the load of the spring 84 by the amount of insertion thereof by press-fitting.

A chamber defined by the piston 80 and the press-fit member 83 is communicated with the downstream side of the main valve, that is, a space communicating with the outlet port 76 via a refrigerant passage 85 formed in the body 71. A pilot valve seat 86 is formed at a location between the refrigerant passage 85 and the space. A pilot valve element 87 in the form of a needle is disposed in a manner opposed to the pilot valve seat 86 from the downstream side thereof, thereby forming a pilot valve together with the pilot valve seat 86.

A solenoid section for controlling the pilot valve is provided on an upper portion of the body 71. The solenoid section comprises a sleeve 89 which has a lower end portion thereof fitted in a fitting hole 88 formed in the upper portion of the body 71, a plunger 90 arranged within the sleeve 89 in an axially movable manner, a hollow cylindrical core 91 fitted in an upper end of the sleeve 89, a shaft 94 which is fixedly arranged in the plunger 90 and axially extends therethrough, with a lower end thereof supported by a bearing 92 formed in the body 71 and an upper end thereof supported by a bearing 93 press-fitted in a hole axially formed through the core 91, a spring 95 which is arranged between the plunger 90 and the bearing 93, for urging the pilot valve element 87 in a valve-closing direction via the shaft 94, a coil 96 arranged outside the sleeve 89, a yoke 97 formed in a manner surrounding the outside of the coil 96, and a plate 98 arranged between the yoke 97 and the sleeve 89 to complete a magnetic circuit. The hole through the core 91 has an end thereof closed by a press-fit member 99, and the end of the hole and the end of the press-fit member 99 are sealed by welding. A rubber O ring 100 is disposed in a space surrounded by the body 71, the sleeve 89, and the plate 98.

In the differential pressure control expansion valve constructed as above, first, when high-pressure refrigerant is introduced into the inlet port 72 with the coil 96 being in a deenergized state as shown in the figure, the refrigerant is guided into the chamber above the piston 80. Then, the refrigerant is introduced into the chamber below the piston 80 via the orifice 82 of the main valve element 79 and the refrigerant passage 81 of the piston 80, and further supplied to the pilot valve via the refrigerant passage 85 formed in the body 71. When the differential pressure across the pilot valve exceeds a predetermined value, the refrigerant pushes open the pilot valve element 87 to flow into a space communicating with the outlet port 76. Since this reduces pressure in the chamber below the piston 80, the piston 80 is moved downward, as viewed in the figure, so that the main valve element 79 is moved away from the main valve seat 78 to open the main valve, whereby the refrigerant introduced into the inlet port 72 flows out through the main valve into the outlet port 76.

As the refrigerant flows out into the outlet port 76 to thereby reduce refrigerant pressure on the upstream side of the main valve, the pressure of refrigerant supplied to the pilot valve is also reduced, so that the pilot valve element 87 is moved in a valve-closing direction. This increases the pressure of refrigerant introduced into the chamber below the piston 80, to thereby move the piston 80 upward, as viewed in the figure. Since the main valve element 79 is urged in a valve-closing direction by the upward movement of the piston 80, the main valve reduces the flow rate of refrigerant to increase the pressure of refrigerant on the upstream side of the main valve. The above operations are repeatedly carried out to thereby control the differential pressure across the main valve to a constant value. The differential pressure is determined based on the load of the spring 95 in the solenoid.

Further, when the coil 96 is energized, the plunger 90 is attracted toward the core 91, and the spring force of the spring 95 urging the pilot valve element 87 in the valve-closing direction is reduced to decrease the differential pressure set to the pilot valve. When the value of an electric current energizing the coil 96 is increased, a force for attracting the plunger 90 to the core 91 is increased, whereby it is possible to further decrease the differential pressure set to the pilot valve, that is, the differential pressure across the differential pressure valve.

As described hereinabove, the differential pressure control expansion valve controls refrigerant such that the differential pressure across the main valve becomes equal to a constant value determined by a current supplied to the coil 96. At this time, the variable displacement compressor controls the refrigerant such that the flow rate thereof is held constant, and hence the control of refrigerant by the differential pressure control expansion valve does not conflict with that by the variable displacement compressor.

Figure 9:
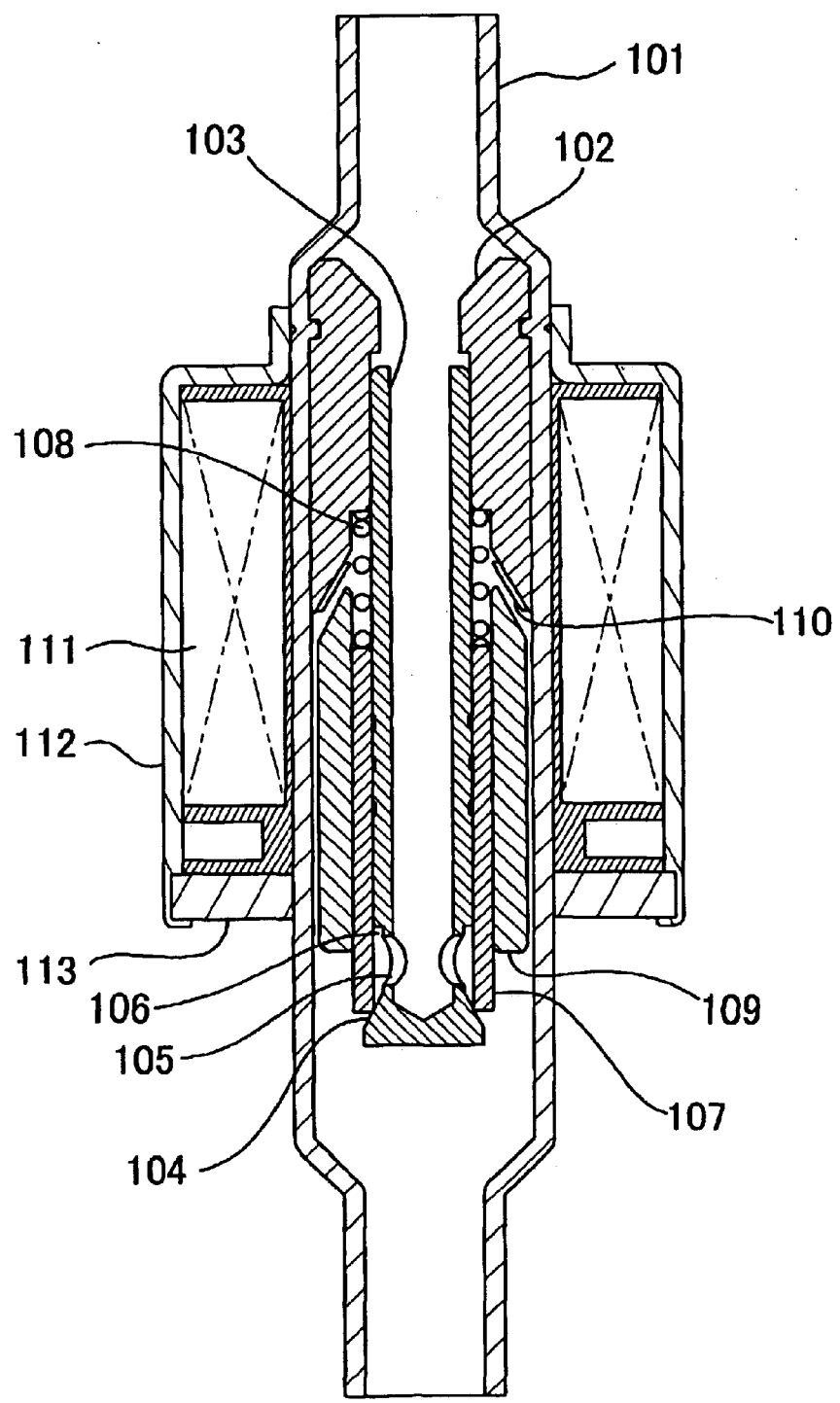
FIG. 9 is a cross-sectional view showing in detail the construction of a proportional control expansion valve employed in the FIG. 5 variable displacement compressor.

FIG. 9 is a cross-sectional view showing in detail the construction of a proportional control expansion valve employed in the FIG. 5 variable displacement compressor.

The proportional control expansion valve has been proposed by the present applicant in the specification of Japanese Patent Application No. 2001-368486. The proportional control expansion valve has a body formed by a straight hollow cylindrical pipe 101 having both ends thereof open. Within the pipe 101, there is arranged a hollow cylindrical core 102 having a fluid passage axially extending therethrough.

The fluid passage of the core 102 has a hollow shaft 103 arranged therein. The hollow shaft 103 has one end thereof fitted in the fluid passage of the core 102 in a manner communicating with the fluid passage. The other end of the shaft 103 is integrally formed with a stopper 104 which projects radially outward from the whole periphery of an extreme end thereof for serving as a tapered valve seat. Further, the shaft 103 is formed with a plurality of valve holes 105 on the circumference thereof at respective locations adjacent to the stopper 104. In the outer peripheral surface of a portion formed with the valve holes 105, there is formed a communication groove 106 along the whole circumference of the shaft 103.

A hollow cylindrical valve element 107 made of a non-magnetic material is arranged between the core 102 and the stopper 104 in a manner axially movable using the shaft 103 as a guide. A spring 108 is arranged between the hollow cylindrical valve element 107 and the core 102, for urging the hollow cylindrical valve element 107 in a direction for bringing the hollow cylindrical valve element 107 into abutment with the stopper 104. Further, a hollow cylindrical plunger 109 is fixedly fitted on the outside of the hollow cylindrical valve element 107 to perform axial motion together with the valve element 107. The plunger 109 is formed to have such an outer diameter that a predetermined gap is produced between the inner wall of the pipe 101 and the plunger 109, so that equal fluid pressures can be applied to the axial both end faces of the plunger 109 through the gap.

The core 102 and the plunger 109 has respective end faces opposed to each other, and the end faces are formed to have respective tapered surfaces sloped with identical gradients so as to improve linearity of attraction characteristics with respect to an energizing electric current. The tapered end face of the core 102 has a washer 110 of a non-magnetic material arranged thereon so as to suppress attraction of the plunger 109 to the core 102 by residual magnetism when the tapered end face of the plunger 109 is demagnetized in a state of being in contact with the washer 110.

Fitted on the outer peripheral surface of the pipe 101 is a coil 111 which is surrounded by a yoke 112 and a plate 113.

Further, the pipe 101 has open both ends forming refrigerant inlet and outlet ports, respectively, each of which is drawn in a manner adapted to the diameter of a mating pipe to which the pipe 101 is to be welded, when the proportional control expansion valve is assembled with the refrigeration system.

According to the proportional control expansion valve constructed as above, when the coil 111 is in a deenergized state, as shown in the figure, the hollow cylindrical valve element 107 and the plunger 109 are urged downward, as viewed in the figure, by the spring 108, to thereby bring an end of the hollow cylindrical valve element 107 into abutment with the stopper 104. This causes the valve holes 105 and the communication groove 106 adjacent to the stopper 104 to be closed by the side wall of the hollow cylindrical valve element 107, whereby the fluid passage is blocked. As a result, even if refrigerant is introduced from an upper opening, as viewed in the figure, of the pipe 101, or from a lower opening, as viewed in the figure, of the same, the refrigerant is inhibited from flowing out into the other opening.

Now, when the maximum current is supplied to the coil 111, the plunger 109 is attracted toward the core 102 against the urging force of the spring 108, and the tapered end face of the plunger 109 is brought into abutment with the washer 110. At this time, the hollow cylindrical valve element 107 moves together with the plunger 109, and from a time point the stopper-side end of the hollow cylindrical valve element 107 has reached the communication groove 106, stops closing of the valve holes 105 and the communication groove 106 to thereby allow communication between the open both ends of the pipe 101 via the valve holes 105 and the communication groove 106. Thus, the size of the refrigerant passage is controlled to be maximum.

Now, when the value of electric current to be supplied to the coil 111 is changed, the plunger 109 is stopped at an axial position where the attractive force of the core 102 and the urging force of the spring 108 are balanced with each other, depending on the current value. Thus, the proportional solenoid valve can be set to a valve lift corresponding to the current value.

Next, a description will be given of the case where the variable displacement compressor 1 of the differential pressure control type and the electronic expansion valve 3 of the flow rate control type or the proportional control type are combined.

Figure 10:
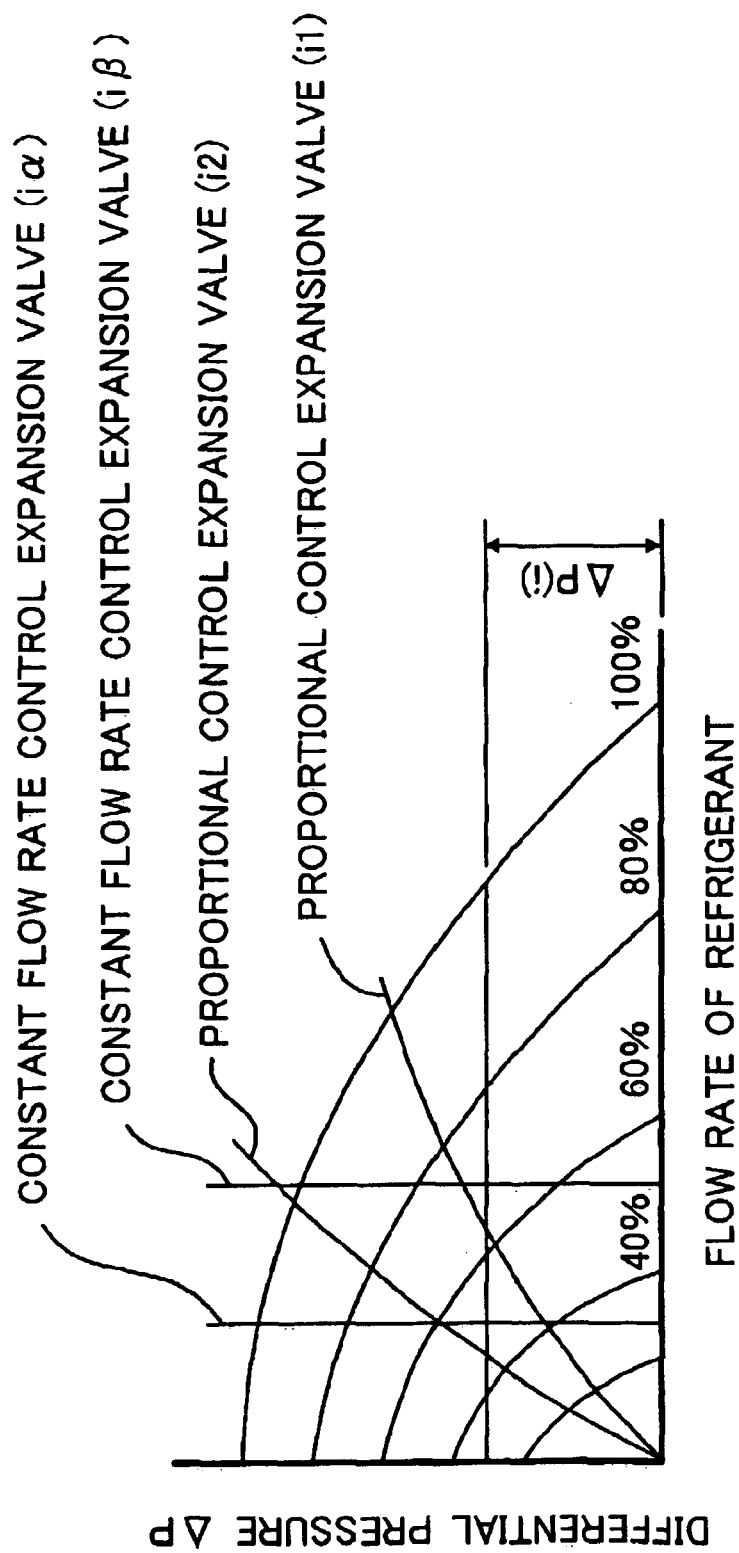
FIG. 10 is a diagram showing differential pressure-flow rate characteristics of the first refrigeration system when the variable displacement compressor is of the differential pressure control type.

FIG. 10 is a diagram showing differential pressure-flow rate characteristics of the first refrigeration system incorporating the differential pressure control-type variable displacement compressor.

In the illustrated characteristics, the ordinate represents the differential pressure between a discharge pressure Pd and a suction pressure Ps of the variable displacement compressor 1, and the abscissa represents the flow rate of refrigerant flowing through the refrigeration cycle.

Since the variable displacement compressor 1 is of the differential pressure control type, the differential pressure $\Delta P(i)$ between a discharge pressure Pd and a suction pressure Ps of the variable displacement compressor 1 is determined by the current value i of the first external electric signal supplied by the drive circuit 6. Further, as to flow rate control carried out by the electronic expansion valve 3, when the electronic expansion valve 3 is a constant flow rate control expansion valve, the flow rate is determined by the current value $i\alpha$, $i\beta$ of the second external electric signal supplied to the constant flow rate control expansion valve, whereas when the electronic expansion valve 3 is a proportional control expansion valve, the inclination is determined by the current value i1, i2 of the second external electric signal supplied to the proportional control expansion valve. Accordingly, in this refrigeration system, since the flow rate Gf of refrigerant and the differential pressure $\Delta P(i)$ of the variable displacement compressor 1 can be known, it is possible to know a variable displacement ratio from the determined flow rate Gf and the differential pressure $\Delta P$.

Next, a description will be given of examples of the differential pressure control-type variable displacement compressor 1 and the electronic expansion valve 3 of the constant flow rate control type, which constitute the first refrigeration system. Although an expansion valve of the proportional control type as well can be used as the electronic expansion valve 3, the FIG. 9 proportional control expansion valve can be an example of this, so that illustration thereof is omitted here.

Figure 11:
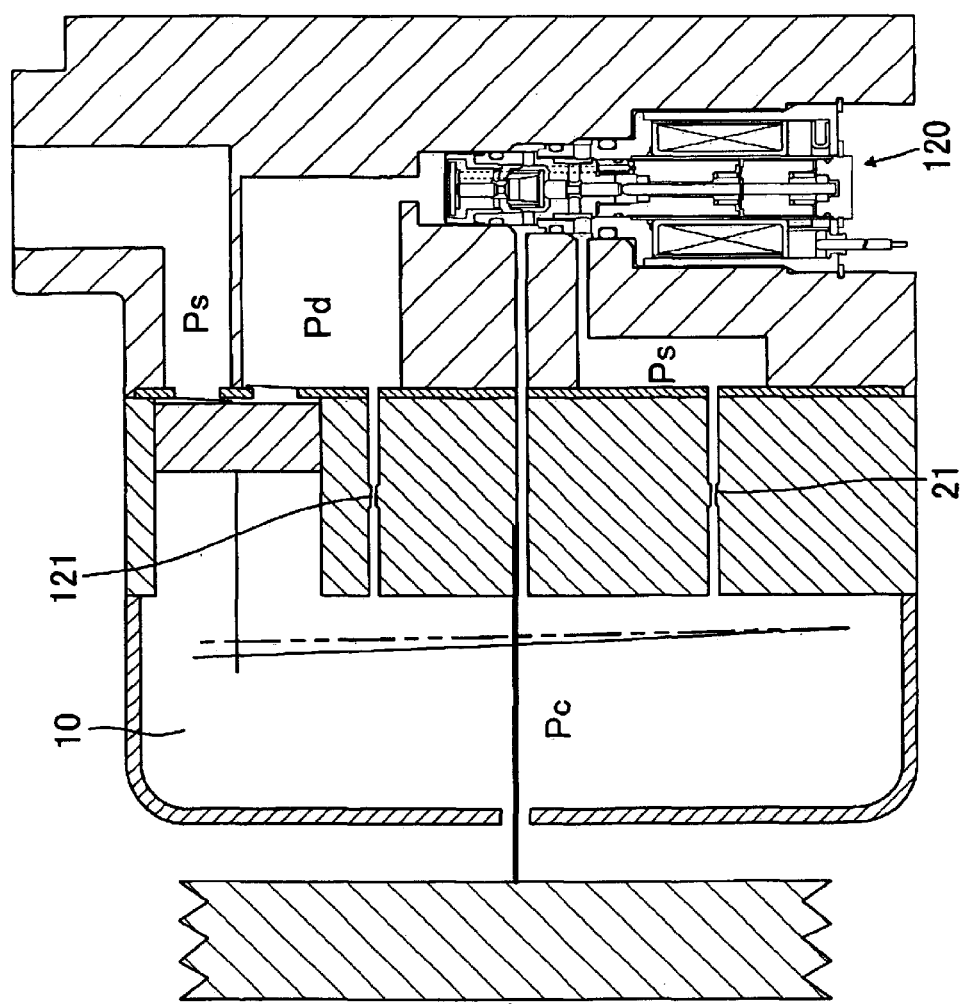
FIG. 11 is a cross-sectional view showing an example of the construction of the differential pressure control-type variable displacement compressor.
Figure 12:
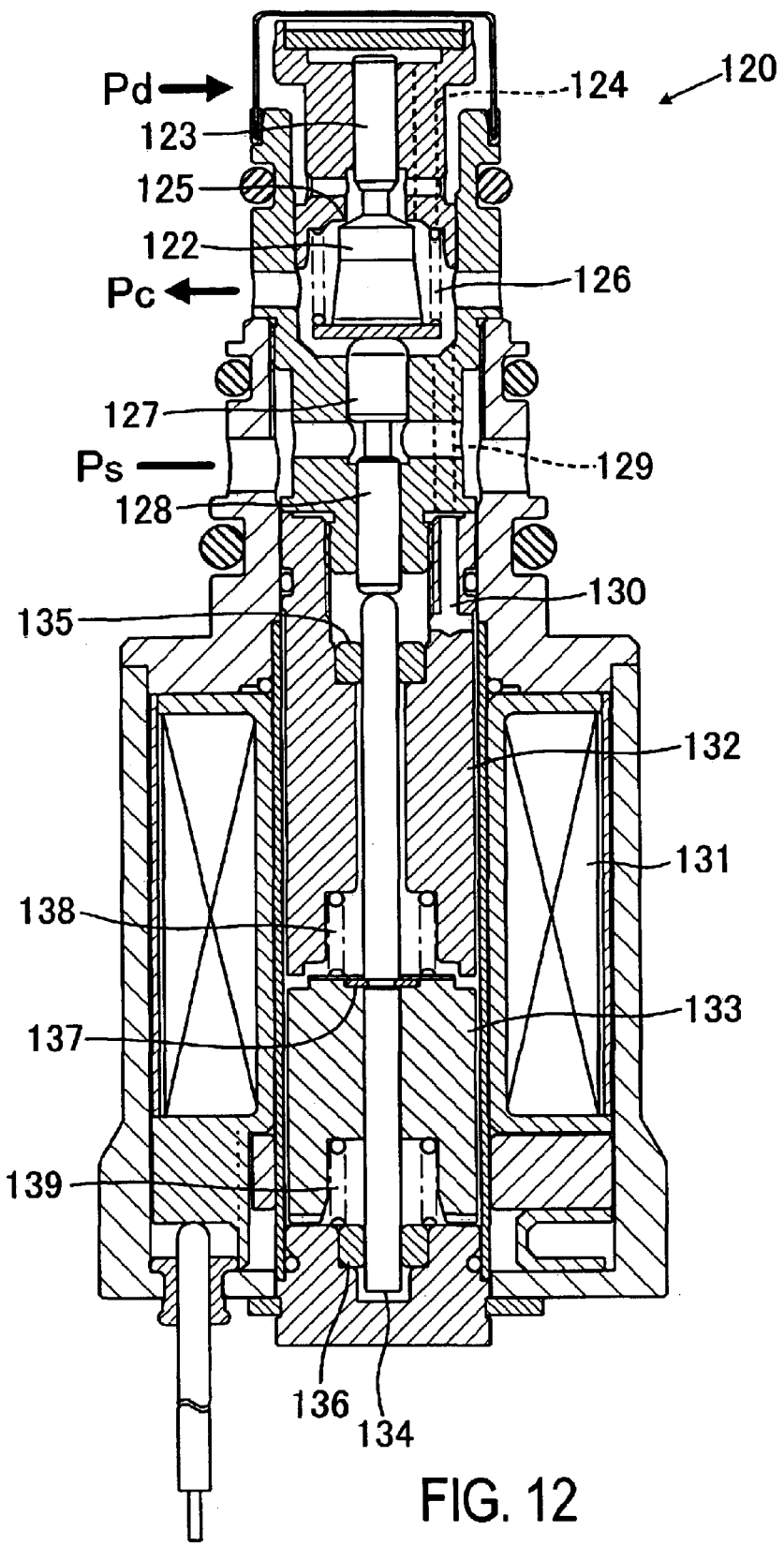
FIG. 12 is a cross-sectional view showing in detail the construction of a capacity control valve employed in the FIG. 11 variable displacement compressor.

FIG. 11 is a cross-sectional view showing an example of the construction of the differential pressure control-type variable displacement compressor. FIG. 12 is a cross-sectional view showing in detail the construction of a capacity control valve employed in the FIG. 11 variable displacement compressor. It should be noted that in FIG. 11, component elements identical to or equivalent to those shown in FIG. 3 are designated by the same reference numerals, and detailed description thereof is omitted.

The variable displacement compressor has been proposed by the present applicant in the specification of Japanese Patent Application No. 2002-86084, which has a capacity control valve 120 provided at an intermediate portion of a refrigerant passage leading from a discharge chamber to a crank chamber 10, for control of the differential pressure Pd–Ps, and orifices 121, 21 provided between the discharge chamber and the crank chamber 10, and between the crank chamber 10 and a suction chamber, respectively.

As shown in FIG. 12, the capacity control valve 120 has a valve element 122 for receiving discharge pressure Pd from the discharge chamber and introducing pressure Pc into the crank chamber 10. The valve element 122 is integrally formed with a pressure-sensing piston 123. The pressure-sensing piston 123 is configured such that an upper end thereof, as viewed in the figure, receives the pressure Pc from the crank chamber 10 via a passage 124. The valve element 122 is urged by a spring 126 in a direction in which it moves away from a valve seat 125.

Two piston rods 127, 128 having different diameters are axially movably arranged between the valve element 122 and a solenoid section. The upper piston rod 127 has the same diameter as that of the valve seat 125, and the lower piston rod 128 has the same diameter as that of the pressure-sensing piston 123 integrally formed with the valve element 122. A connecting section for connecting the piston rods 127, 128 to each other is reduced in diameter to form a space for communicating with the suction chamber to receive the suction pressure Ps. A lower end, as viewed in the figure, of the piston rod 128 is configured to receive the pressure Pc from the crank chamber 10 via the passages 129, 130.

The solenoid section includes a coil 131, a core 132, a plunger 133, and a shaft 134. The shaft 134 has both ends thereof supported by guides 135, 136, and an upper end portion thereof is in abutment with the piston rod 128. The shaft 134 has an E ring 137 fitted thereon such that when the plunger 133 is moved in a manner attached by the core 132, the shaft 134 is moved together with the plunger 133. Further, springs 138, 139 are disposed at axially both ends of the plunger 133.

The capacity control valve 120 forms a differential pressure valve which senses the differential pressure ΔP between a discharge pressure Pd and a suction pressure Ps, for operation, and controls the flow rate of refrigerant flowing from the discharge chamber to the crank chamber 10 such that the differential pressure ΔP is held constant. A constant value to which the differential pressure ΔP(i) to be controlled can be determined by an electric current i supplied to the coil 131 of the solenoid.

Figure 13:
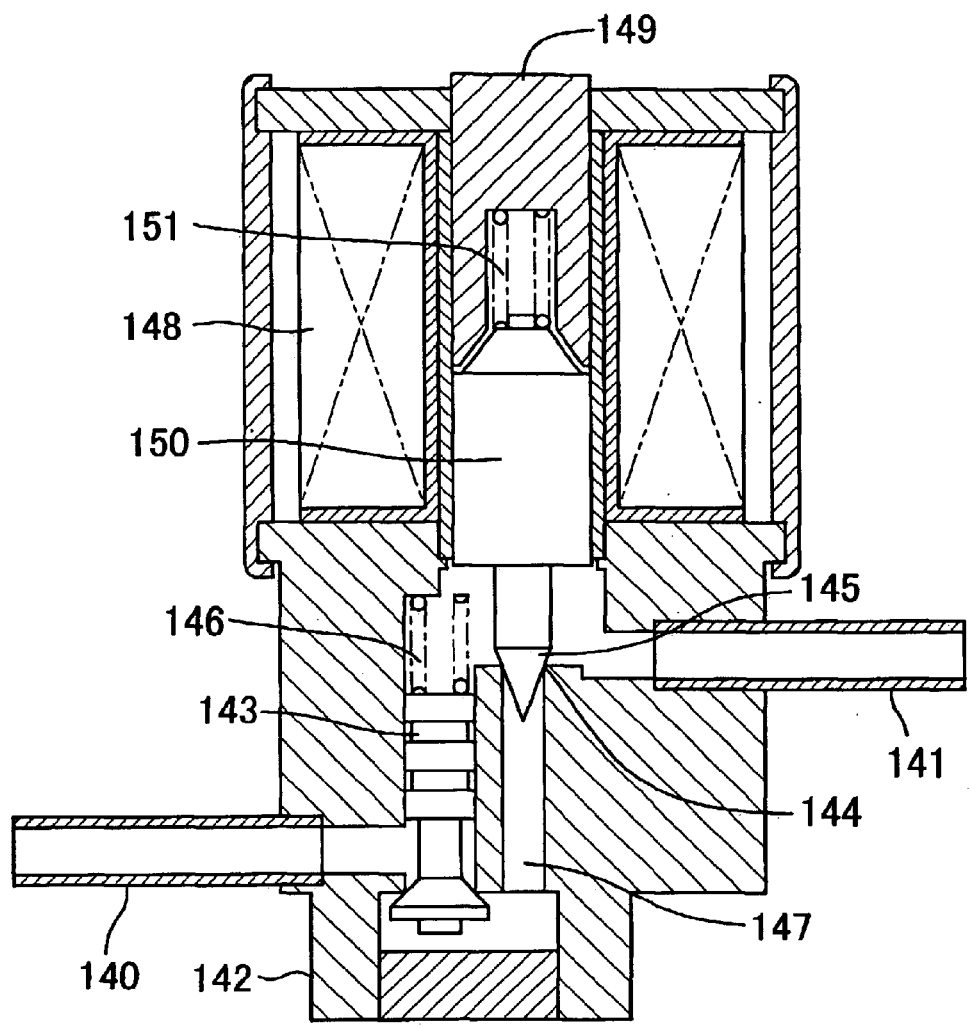
FIG. 13 is a cross-sectional view showing in detail the construction of a constant flow rate control expansion valve employed in the FIG. 11 variable displacement compressor.

FIG. 13 is a cross-sectional view showing in detail the construction of a constant flow rate control expansion valve employed in the FIG. 11 variable displacement compressor.

The constant flow rate control expansion valve has been proposed by the present applicant in Japanese Unexamined Patent Publication No. 2001-153495, in which an inlet flow passage 140 via which high-pressure refrigerant is received from the condenser 2, and an outlet flow passage 141 via which refrigerant is delivered to the evaporator 4 while being adiabatically expanded are connected to a body block 142.

Two bores are formed in parallel with each other between spaces in the body block 142 which communicate with the inlet flow passage 140 and the outlet flow passage 141. One of the bores forms a valve section capable of changing the size of a refrigerant passage, and the other of the bores has a constant differential pressure valve element 143 axially movably inserted therein which forms a constant flow rate mechanism.

The valve section for changing the size of the refrigerant passage has a tapered valve element 145 axially movably arranged in a manner opposed to a valve seat 144 thereof from the downstream side of the valve seat. The valve element 145 axially moves to and away from the valve seat 144, whereby it is possible to change a cross-sectional area of the refrigerant passage formed by a gap between the valve seat 144 and the valve element 145.

Further, in the constant flow rate mechanism, the constant differential pressure valve element 143 is urged by a spring 146 from the downstream side thereof, and an upstream-side end portion of the constant differential pressure valve element 143 forms a valve element for opening and closing between the inlet flow passage 140 which opens laterally, and a refrigerant passage 147 on the upstream side of the valve section.

A solenoid section for actuating the valve element 145 of the valve section includes a coil 148, a core 149, a plunger 150 integrally formed with the valve element 145, and a spring 151 for urging the plunger 150 in a direction of reducing the cross-sectional area of the refrigerant passage of the valve section.

Due to the construction described above, the constant differential pressure valve element 143 operates such that the differential pressure between a refrigerant pressure in the refrigerant passage 147 and a refrigerant pressure on the side of the outlet flow passage 141 is held at a constant value set by the spring 146. On the other hand, the valve element 145 of the valve section is made stationary in a position where the urging force of the spring 151 disposed between the plunger 150 and the core 149, and a thrust applied to the plunger 150 according to the value of electric current energizing the coil 148 are balanced with each other, whereby the cross-sectional area of the refrigerant passage formed by the gap between the valve seat 144 and the valve element 145 is controlled by the value of the electric current energizing the coil 148.

In the constant flow rate control expansion valve constructed as above, the differential pressure across the refrigerant passage formed by the gap between the valve seat 144 and the valve element 145 is controlled to a constant value by the constant flow rate mechanism, whereby the flow of refrigerant through the valve section is held at a constant flow rate corresponding to the value of the electric current energizing the coil 148.

Next, a description will be given of a case in which a variable displacement compressor 1 is of a type the suction pressure Ps of which is controlled, and the control is performed by using a sensor for detecting the discharge pressure Pd, whereby control similar to the differential pressure control is effected, as a consequence. In this case, it is possible to employ the electronic expansion valve 3 of the constant flow rate control type shown in FIG. 13, or that of the flow rate control type shown in FIG. 9.

Figure 14:
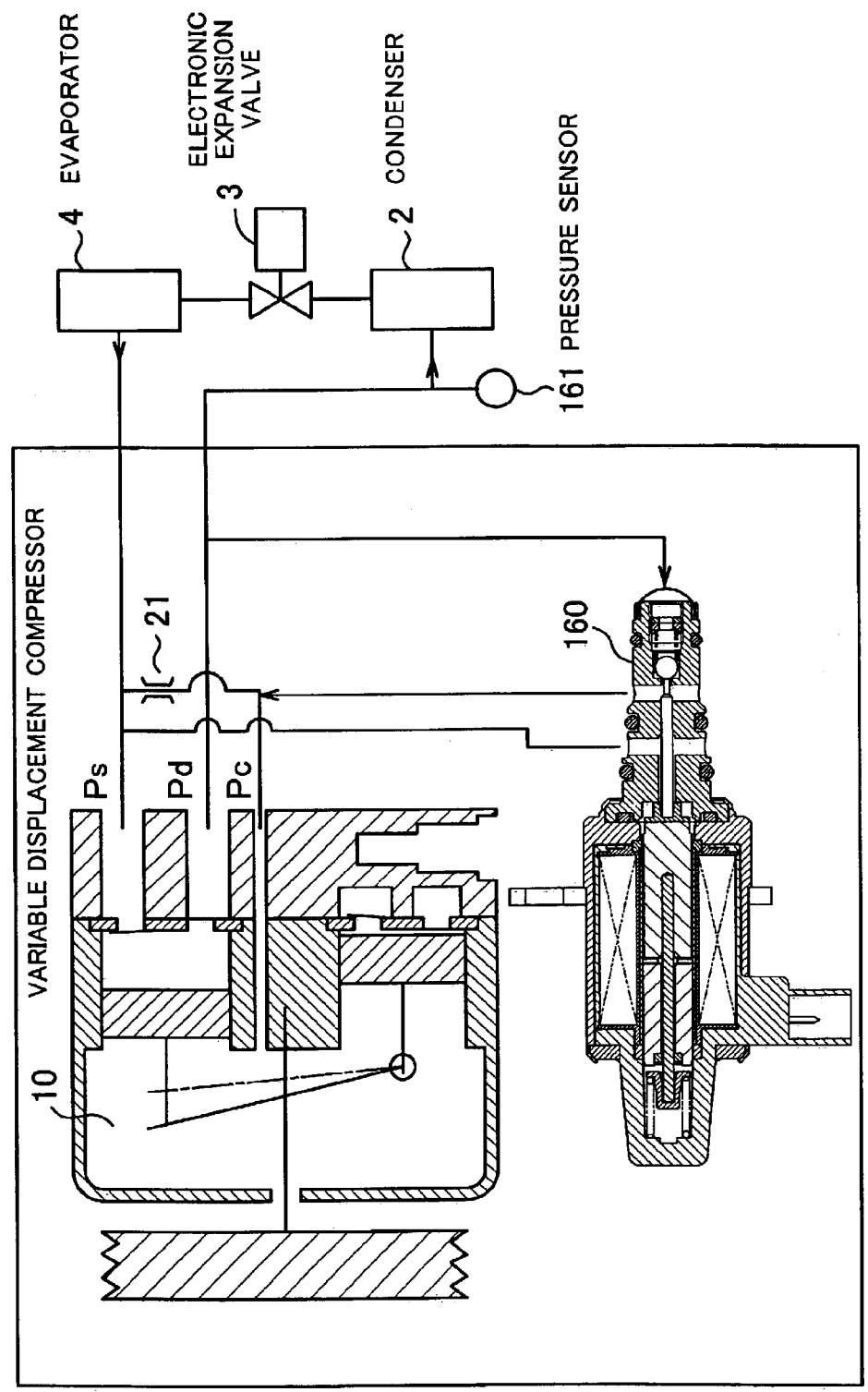
FIG. 14 is a cross-sectional view showing an example of the construction of a variable displacement compressor of the suction pressure control type.
Figure 15:
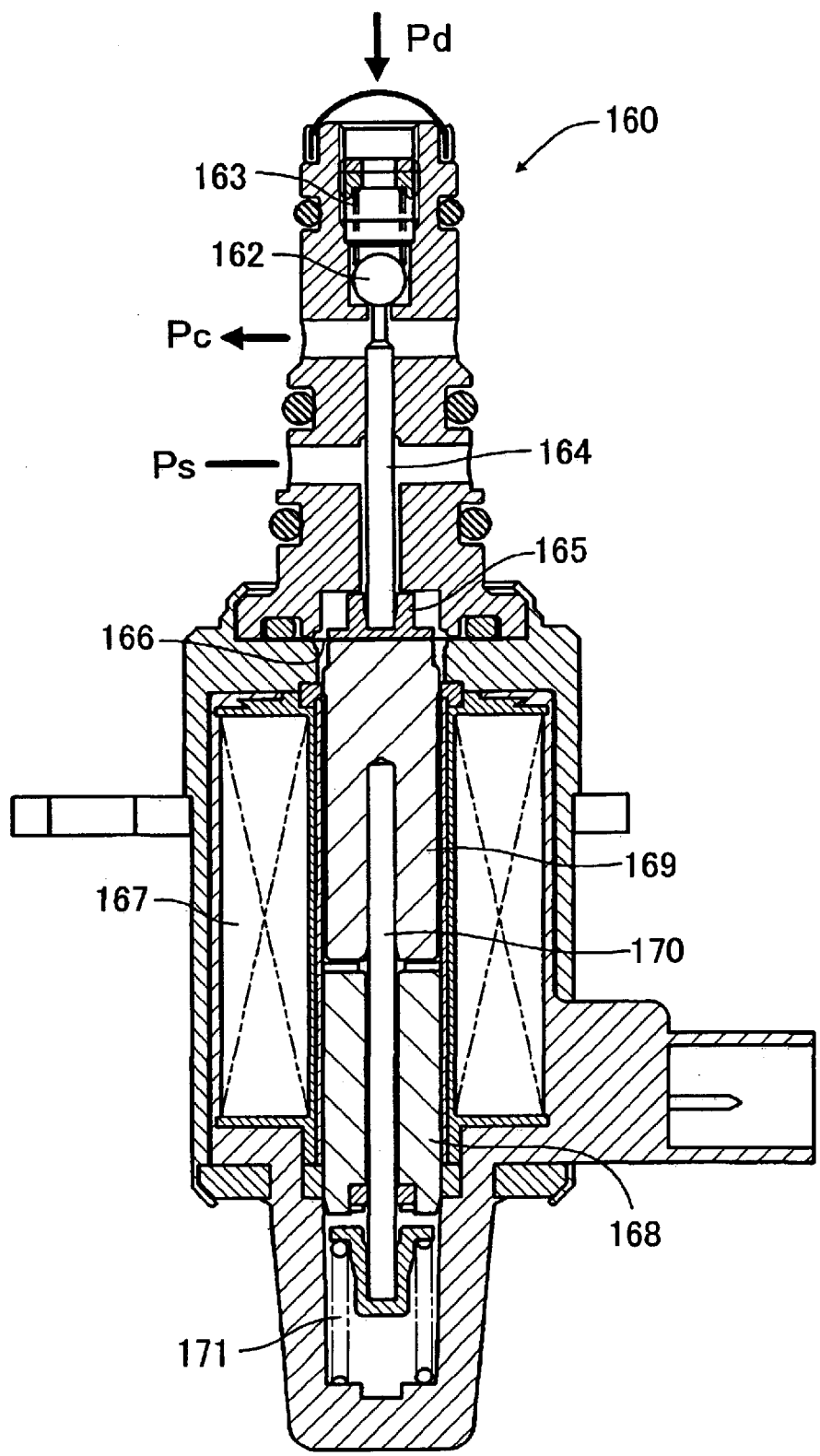
FIG. 15 is a cross-sectional view showing in detail the construction of a capacity control valve employed in the FIG. 14 variable displacement compressor.

FIG. 14 is a cross-sectional view showing an example of the construction of the variable displacement compressor of the suction pressure control type. FIG. 15 is a cross-sectional view showing in detail the construction of a capacity control valve employed in the FIG. 14 variable displacement compressor. It should be noted that in FIG. 14, component elements identical to or equivalent to those shown in FIG. 3 are designated by the same reference numerals, and detailed description thereof is omitted.

In the variable displacement compressor, a capacity control valve 160 for control of the suction pressure Ps is provided at an intermediate portion of a refrigerant passage leading from a discharge chamber to a crank chamber 10, and an orifice 21 is provided between the crank chamber 10 and a suction chamber. Further, a pressure sensor 161 is disposed at an intermediate portion of piping leading from the discharge chamber to the condenser 2, for detecting the discharge pressure Pd.

The capacity control valve 160 has been proposed by the present applicant in Japanese Unexamined Patent Publication No. 2001-295759. As shown in, FIG. 15, the capacity control valve 160 has a valve element 162 for receiving a discharge pressure Pd from the discharge chamber and introducing a pressure Pc into the crank chamber 10. The valve element 162 is urged by a spring 163 in a valve-closing direction. The capacity control valve 160 has a shaft 164 inserted therein along its central axis such that one end of the shaft 164 is in abutment with the valve element 162. The other end of the shaft 164 is disposed in a manner brought into abutment with a diaphragm 166 via a disc 165. A diaphragm chamber on a side where the disc 165 is located is communicated with the suction chamber such that the diaphragm 166 receives the suction pressure Ps.

A solenoid section of the capacity control valve 160 includes a coil 167, a core 168, a plunger 169 having one end thereof brought into abutment with the diaphragm 166, and a spring 171 for urging the plunger 169 toward the diaphragm 166 via a shaft 170.

Due to the construction described above, in the capacity control valve 160, the diaphragm 166 receives the suction pressure Ps, and the valve element 162 supplies refrigerant discharged from the discharge chamber and having the discharge pressure Pd, to the crank chamber 10 such that the suction pressure Ps becomes constant. A target pressure to which the suction pressure Ps should be constantly controlled is determined by the value of a control current supplied to the coil 167 based on the discharge pressure Pd detected by the pressure sensor 161.

In the above embodiment described above, as the first refrigeration system, a system has been described in which the capacity control valve is provided between the discharge chamber and the crank chamber 10, with the orifice 21 being provided between the crank chamber 10 and the suction chamber, whereby the capacity control valve controls the amount in which the refrigerant having the discharge pressure Pd is introduced into the crank chamber 10. In the following, a description will be given of a refrigeration system for carrying out capacity control of a compressor by a method other than the method of control of the flow rate of refrigerant to be introduced into the crank chamber 10.

Figure 16:
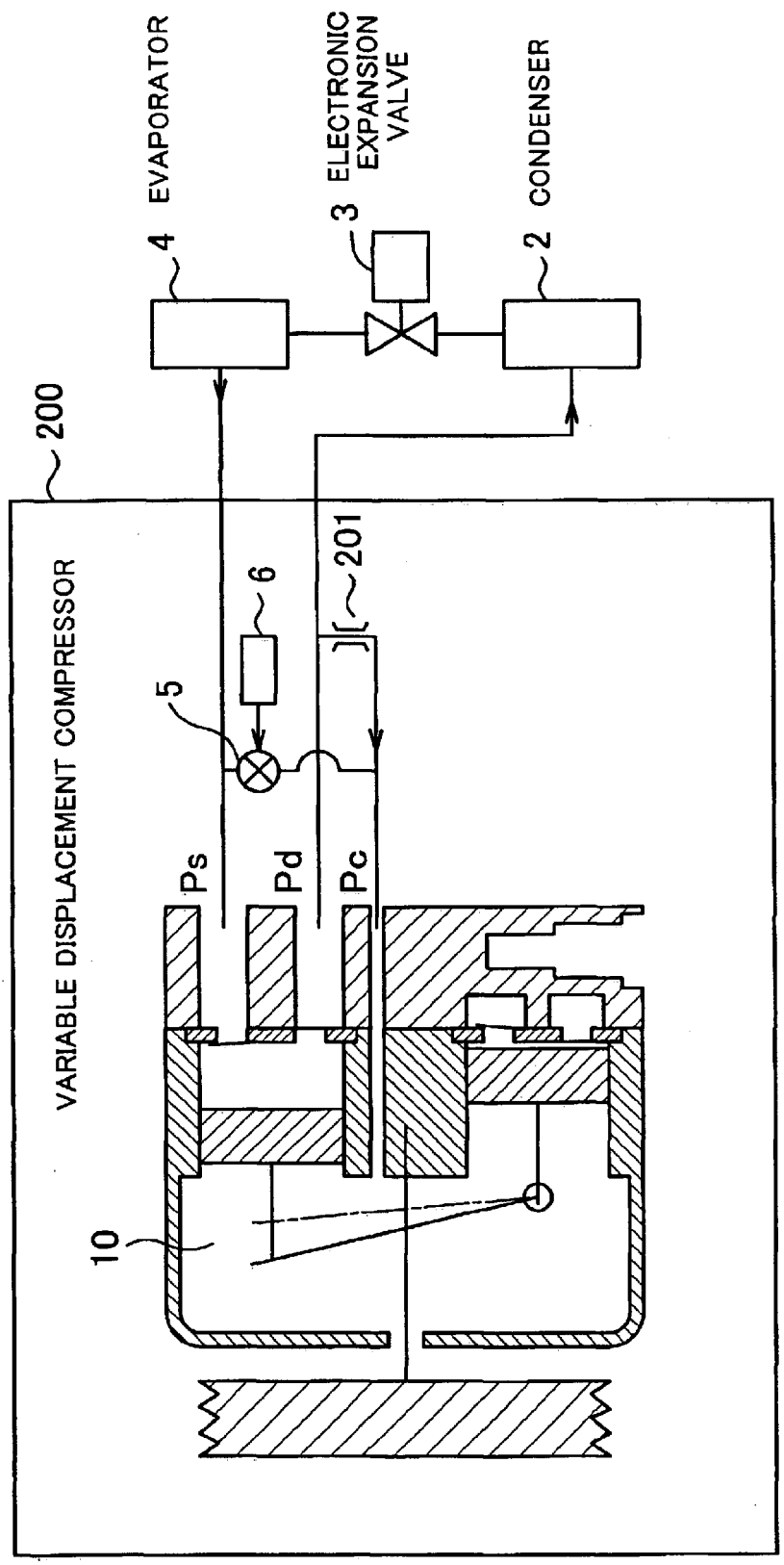
FIG. 16 is a diagram illustrating the basic construction of a second refrigeration system.

FIG. 16 is a diagram illustrating the basic construction of a second refrigeration system. It should be noted that in FIG. 16, component elements identical to or equivalent to those shown in FIG. 1 are designated by the same reference numerals, and detailed description thereof is omitted.

The second refrigeration system is configured such that in a variable displacement compressor 200, an orifice 201 is provided between a discharge chamber and a crank chamber 10, and a capacity control valve 5 is provided between the crank chamber 10 and a suction chamber, for being actuated by a drive circuit 6.

In the second refrigeration system as well, it is possible to use the same types of capacity control valve 5 and electronic expansion valve 3 as used in the first refrigeration system. More specifically, the second refrigeration system can be constructed such that the capacity control valve 5 of the variable displacement compressor 200 is implemented by the flow rate control type, and the electronic expansion valve 3 by the differential pressure control type or the proportional control type, or that the capacity control valve 5 of the variable displacement compressor 200 is implemented by the differential pressure control type, and the electronic expansion valve 3 by the flow rate control type or the proportional control type, or that the capacity control valve 5 of the variable displacement compressor 200 is implemented by the suction pressure control type, and the electronic expansion valve 3 by the flow rate control type or the proportional control type.

Figure 17:
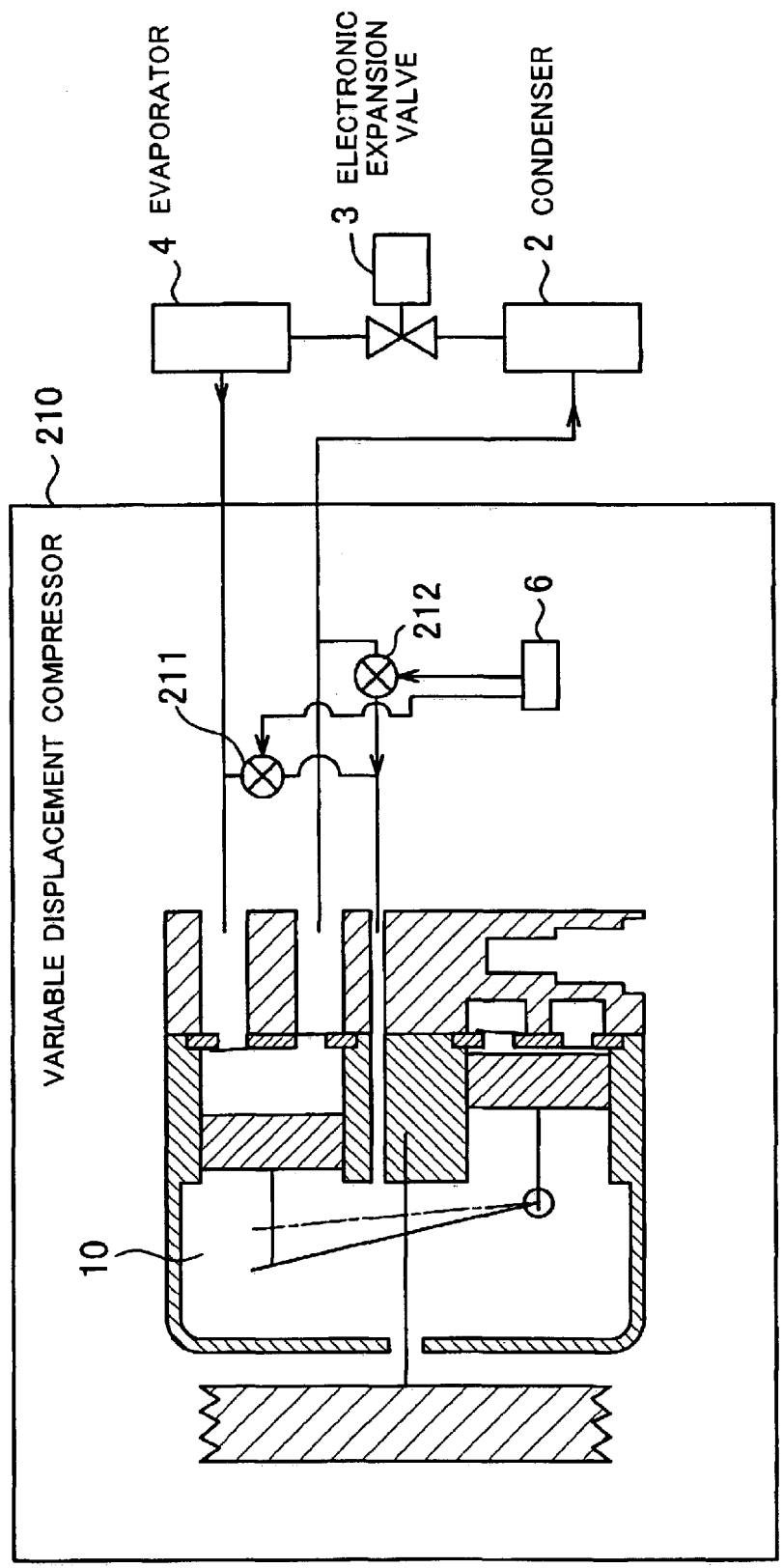
FIG. 17 is a diagram illustrating the basic construction of a third refrigeration system.

FIG. 17 is a diagram illustrating the basic construction of a third refrigeration system. It should be noted that in FIG. 17, component elements identical to or equivalent to those shown in FIG. 1 are designated by the same reference numerals, and detailed description thereof is omitted.

The third refrigeration system is configured such that in a variable displacement compressor 210 for compressing refrigerant, capacity control valves 211, 212 are provided between a discharge chamber and a crank chamber 10, and between the crank chamber 10 and a suction chamber, and these capacity control valves 211, 212 are actuated by a drive circuit 6.

Next, a description will be given of an example of the variable displacement compressor 210 as a component of the third refrigeration system.

Figure 18:
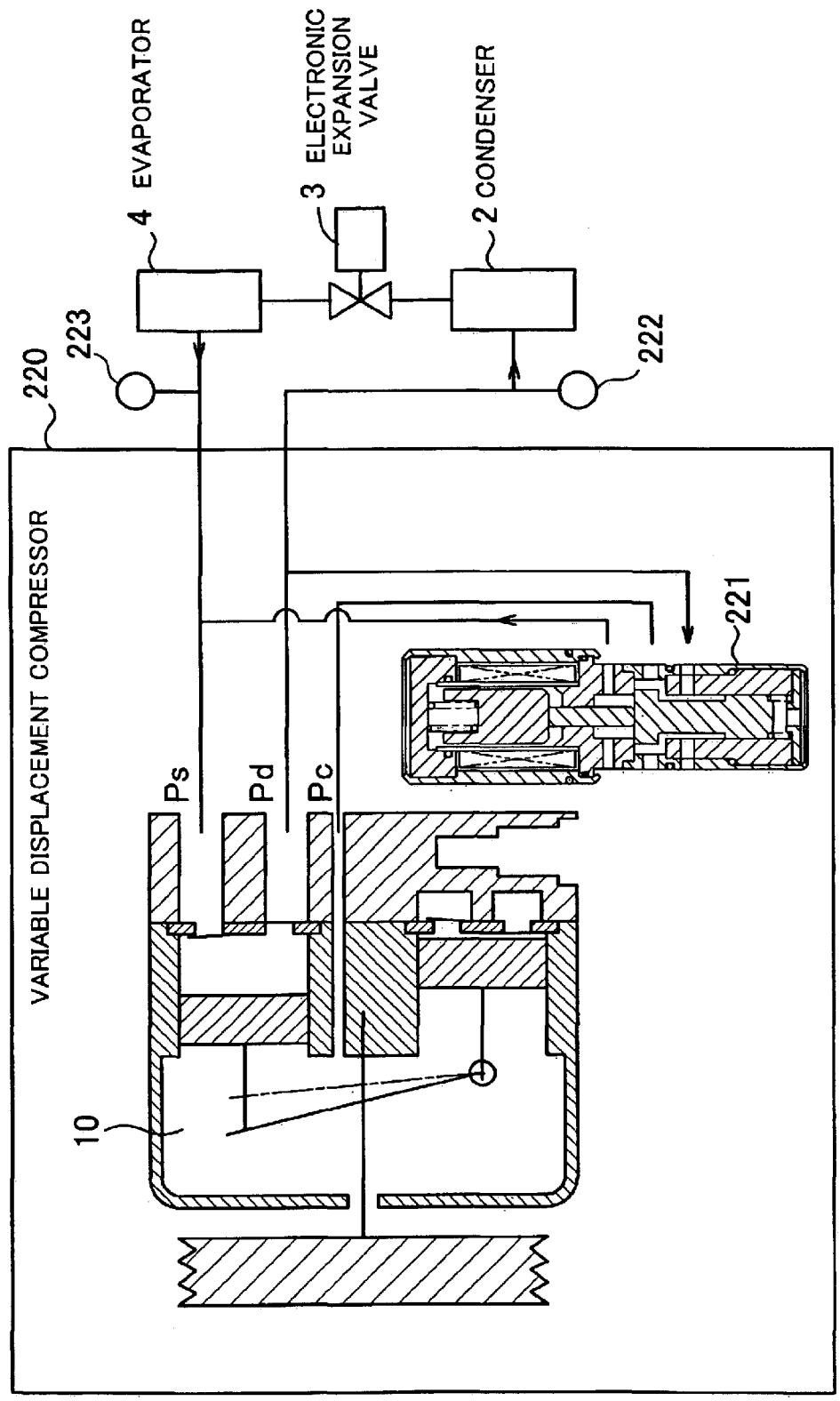
FIG. 18 is a cross-sectional view showing an example of the construction of the variable displacement compressor.
Figure 19:
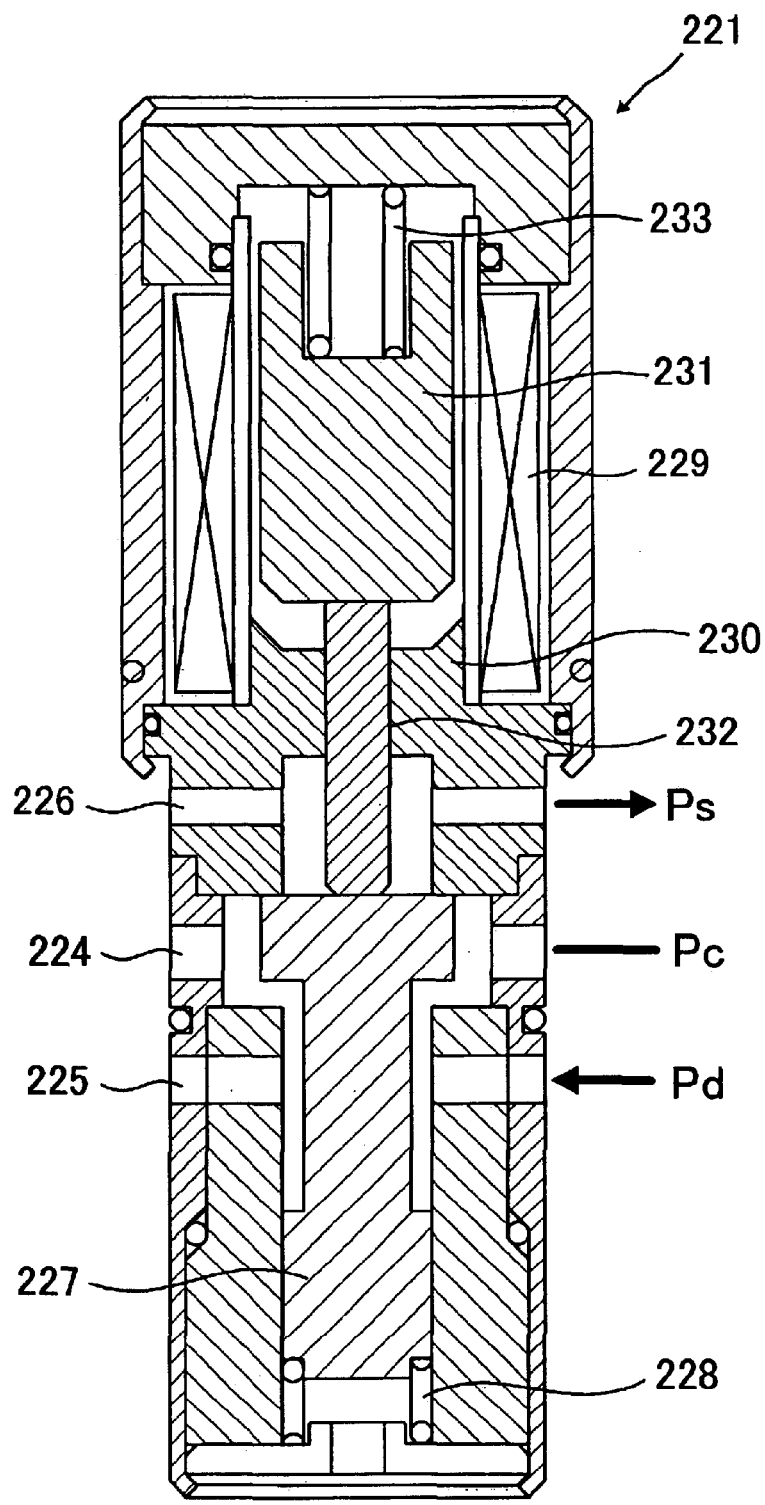
FIG. 19 is a cross-sectional view showing in detail the construction of a pressure control valve employed in the FIG. 18 variable displacement compressor.

FIG. 18 is a cross-sectional view showing an example of the construction of the variable displacement compressor. FIG. 19 is a cross-sectional view showing in detail the construction of a pressure control valve employed in the FIG. 18 variable displacement compressor. It should be noted that in FIG. 18, component elements identical to or equivalent to those shown in FIG. 1 are designated by the same reference numerals, and detailed description thereof is omitted.

In a variable displacement compressor 220, one pressure control valve 221 is provided between a discharge chamber and a crank chamber 10 and between the crank chamber 10 and a suction chamber for controlling the sizes of refrigerant passages in an interlocking fashion. To control the pressure control valve 221, a pressure sensor 222 is disposed at an intermediate portion of piping leading from the discharge chamber to the condenser 2, for detecting a discharge pressure Pd, and a pressure sensor 223 is disposed at an intermediate portion of piping leading from the evaporator 4 to the suction chamber, for detecting a suction pressure Ps. A ratio between the size of the passage between the discharge chamber and the crank chamber 10 and that of the passage between the crank chamber 10 and the suction chamber is changed based on the discharge pressure Pd detected by the pressure sensor 222 and the suction pressure Ps detected by the pressure sensor 223, whereby the amount of refrigerant introduced into the crank chamber 10 and the amount of refrigerant guided out from the crank chamber 10 are controlled to vary the delivery capacity of the compressor.

The pressure control valve 221 has been disclosed in Japanese Unexamined Patent Publication No. 2001-12358. As shown in FIG. 19, the pressure control valve 221 includes a port 224 communicating with the crank chamber 10, a port 225 communicating with the discharge chamber, and a port 226 communicating with the suction chamber, with a valve element 227 being disposed in an inner space communicating with the port 224, for varying a ratio between the size of a refrigerant passage communicating with the port 225 and that of a refrigerant passage communicating with the port 226 in an interlocking fashion, thereby forming a three-way valve. The valve element 227 is urged by a spring 228 in a direction of closing of a passage between the port 224 communicating with the crank chamber 10 and the port 226 communicating with the suction chamber.

The valve element 227 is actuated by a solenoid section, for control of the ratio between the sizes of the refrigerant passages. The solenoid section includes a coil 229, a core 230, a plunger 231, a shaft 232, and a spring 233 urging the plunger 231 in a direction of the valve element 227 closing a passage between the port 224 communicating with the crank chamber 10 and the port 225 communicating with the discharge chamber, via the shaft 232.

By changing an electric current supplied to the coil 229, an axial position of the valve element 227 is changed. This makes it possible to control the flow rate of refrigerant introducing the discharge pressure Pd into the crank chamber 10 and the flow rate of refrigerant flowing from the crank chamber 10 to the suction chamber, to thereby control a pressure Pc within the crank chamber 10, for control of the capacity of the variable displacement compressor 220.

Although the preferred embodiments of the present invention have been described in detail hereinabove, the present invention is not limited to the above particular embodiments. For instance, although in the above embodiments, the construction for continuously controlling the flow rate of refrigerant introduced into the crank chamber is illustrated as the capacity control valve of the variable displacement compressor, this is not limitative, but it is also possible to control the flow rate of refrigerant introduced into the crank chamber, using an ON-OFF control valve as described e.g. in Japanese Utility Model Publication No. 3-27261 to control an ON-OFF time ratio. Further, although the solenoid-actuated expansion valve is illustrated as the electronic expansion valve by way of example, the control of the valve lift of the expansion valve may be carried out by a stepping motor as described e.g. in Japanese Unexamined Patent Publication No. 9-310777. Further, although the above first to third refrigeration systems are examples of the construction of the refrigeration cycle in which a chlorofluorocarbon substitute HFC-134a is used as refrigerant, it goes without saying that the invention can be similarly applied to a supercritical refrigeration cycle using carbon dioxide as refrigerant if only the condenser is replaced by a gas cooler.

As described heretofore, according to the present invention, in the refrigeration cycle of an automotive air conditioner, the differential pressure in a variable displacement compressor and that across an expansion valve and the flow rates of refrigerant flowing therethrough are estimated based on an electric signal for controlling a capacity control valve controlling the capacity of the variable displacement compressor, and an electric signal for controlling the expansion valve. This makes it possible to know energy of the refrigeration cycle, and further to estimate the energy with high accuracy, since the electric signals controlling the capacity control valve and the expansion valve are directly made use of. Therefore, it is possible to carry out energy control for maximum refrigerating capacity operation, maximum efficiency operation, required minimum refrigerating capacity operation, and so forth, thereby making it possible to perform fuel consumption saving operation. Further, since the driving torque of the compressor can be estimated with high accuracy by using the engine rotational speed, it becomes possible to control the refrigeration cycle in a more refined and detailed manner, and when the engine requires large driving torque, it is possible to carry out torque control such that the driving torque of the compressor is decreased. This makes it possible to avoid stalling of the engine and excessive rotational speed, thereby making it possible to maintain an appropriate idling state.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of controlling a refrigeration cycle of an automotive air conditioner, characterized by estimating a differential pressure between a high pressure-side refrigerant pressure and a low pressure-side refrigerant pressure in the refrigeration cycle and a flow rate of refrigerant flowing therethrough, based on a first external electric signal for controlling the differential pressure between the high pressure-side refrigerant pressure and the low pressure-side refrigerant pressure in the refrigeration cycle or the flow rate of refrigerant flowing therethrough and a second external electric signal for controlling a size of a refrigerant passage in the refrigeration cycle, and estimating a compressor variable displacement ratio and driving torque of a compressor based on the estimated differential pressure and flow rate of refrigerant and an engine rotational speed; and controlling the first external electric signal and the second external electric signal such that refrigerating capacity of the refrigeration cycle is maximized when the automotive air conditioner is started, efficiency of the refrigeration cycle is maximized when the vehicle is in a steady traveling condition, and the driving torque of the compressor is reduced when the vehicle is in an accelerating condition.

2. The method of controlling the refrigeration cycle according to claim 1, wherein the first external electric signal is a control signal for controlling displacement of a variable displacement compressor, the control signal determining a flow rate of refrigerant flowing through the variable displacement compressor, and wherein the second external electric signal is a control signal for determining a differential pressure between a high pressure-side refrigerant pressure and a low pressure-side refrigerant pressure in an expansion device.

3. The method of controlling the refrigeration cycle according to claim 2, wherein the first external electric signal is a signal for a control valve that controls the flow rate of refrigerant to a constant value by sensing a differential pressure across a fixed orifice provided in a refrigerant passage through which refrigerant flows and controlling a pressure within a crank chamber of the variable displacement compressor.

4. The method of controlling the refrigeration cycle according to claim 2, wherein the first external electric signal is a signal for a flow rate control valve disposed in a refrigerant passage through which refrigerant flows, to form a variable orifice, and wherein a constant differential pressure valve controls a pressure within a crank chamber of the variable displacement compressor such that a differential pressure across the flow rate control valve is held constant.

5. The method of controlling the refrigeration cycle according to claim 1, wherein the first external electric signal is a control signal for controlling displacement of a variable displacement compressor, the control signal determining a flow rate of refrigerant flowing through the variable displacement compressor, and wherein the second external electric signal is a signal for proportionally controlling an area of a refrigerant passage in an expansion device.

6. The method of controlling the refrigeration cycle according to claim 5, wherein the first external electric signal is a signal for a control valve that controls the flow rate of refrigerant to a constant value by sensing a differential pressure across a fixed orifice provided in a refrigerant passage through which refrigerant flows and controlling a pressure within a crank chamber of the variable displacement compressor.

7. The method of controlling the refrigeration cycle according to claim 5, wherein the first external electric signal is a signal for a flow rate control valve disposed in a refrigerant passage through which refrigerant flows, to form a variable orifice, and wherein a constant differential pressure valve controls a pressure within a crank chamber of the variable displacement compressor such that a differential pressure across the flow rate control valve is held constant.

8. The method of controlling the refrigeration cycle according to claim 1, wherein the first external electric signal is a control signal for controlling displacement of a variable displacement compressor, the control signal determining a differential pressure between a high pressure-side refrigerant pressure and a low pressure-side refrigerant pressure in the variable displacement compressor, and wherein the second external electric signal is a control signal for determining a flow rate of refrigerant flowing through an expansion valve.

9. The method of controlling the refrigeration cycle according to claim 1, wherein the first external electric signal is a control signal for controlling displacement of a variable displacement compressor, the control signal determining a differential pressure between a high pressure-side refrigerant pressure and a low pressure-side refrigerant pressure in the variable displacement compressor, and wherein the second external electric signal is a signal for proportionally controlling an area of a refrigerant passage in an expansion device.

10. The method of controlling the refrigeration cycle according to claim 1, wherein the first external electric signal is a control signal for controlling displacement of a variable displacement compressor, the control signal determining the low pressure-side refrigerant pressure in the variable displacement compressor, wherein the differential pressure between the high pressure-side refrigerant pressure and the low pressure-side refrigerant pressure is determined from a sensor for detecting the high pressure-side refrigerant pressure, and wherein the second external electric signal is a control signal for determining a flow rate of refrigerant flowing through an expansion device.

11. The method of controlling the refrigeration cycle according to claim 1, wherein the first external electric signal is a control signal for controlling displacement of a variable displacement compressor, the control signal determining the low pressure-side refrigerant pressure in the variable displacement compressor, wherein the differential pressure between the high pressure-side refrigerant pressure and the low pressure-side refrigerant pressure is determined from a sensor for detecting the high pressure-side refrigerant pressure, and wherein the second external electric signal is a signal for proportionally controlling an area of a refrigerant passage in an expansion device.

12. The method of controlling the refrigeration cycle according to claim 1, wherein the first external electric signal and the second external electric signal directly measure a value of an electric current flowing through a coil of a first control valve for controlling displacement of a variable displacement compressor and a value of an electric current flowing through a coil of a second control valve for controlling an expansion device, and based on the measured current values, the differential pressure between the high pressure-side refrigerant pressure and the low pressure-side refrigerant pressure in the refrigeration cycle and the flow rate of refrigerant flowing therethrough are estimated.

13. The method of controlling the refrigeration cycle according to claim 1, wherein the driving torque of the compressor estimated based on the differential pressure, the flow rate of refrigerant, and the engine rotational speed is used for control of engine output torque.

14. A method of controlling a refrigeration cycle, characterized in that energy of the refrigeration cycle is controlled by estimating a compressor variable displacement ratio and driving torque of a compressor based on a first external electric signal for controlling a differential pressure between a high pressure-side refrigerant pressure and a low pressure-side refrigerant pressure in the refrigeration cycle or a flow rate of refrigerant flowing therethrough, a second external electric signal for controlling a size of a refrigerant passage in the refrigeration cycle, and an engine rotational speed.

* * * * *